(12) United States Patent
Hormati et al.

(10) Patent No.: US 10,116,472 B2
(45) Date of Patent: Oct. 30, 2018

(54) HIGH SPEED COMMUNICATIONS SYSTEM

(71) Applicant: KANDOU LABS, S.A., Lausanne (CH)

(72) Inventors: Ali Hormati, Ecublens Vaud (CH);
Armin Tajalli, Chavannes près Renens (CH); Amin Shokrollahi, Prérenges (CH)

(73) Assignee: KANDOU LABS, S.A., Lausanne (CH)

( * ) Notice: Subject to any disclaimer, the term of this patent is extended or adjusted under 35 U.S.C. 154(b) by 0 days.

(21) Appl. No.: 15/823,194

(22) Filed: Nov. 27, 2017

(65) Prior Publication Data

US 2018/0083807 A1 Mar. 22, 2018

Related U.S. Application Data

(63) Continuation of application No. 15/194,497, filed on Jun. 27, 2016, now Pat. No. 9,832,046.

(Continued)

(51) Int. Cl.
*H04L 25/03* (2006.01)
*H04L 25/49* (2006.01)
*H04L 1/00* (2006.01)

(52) U.S. Cl.
CPC ...... *H04L 25/03885* (2013.01); *H04L 1/0041* (2013.01); *H04L 1/0057* (2013.01);
(Continued)

(58) Field of Classification Search
CPC ............. H04L 25/03885; H04L 1/0041; H04L 1/0057; H04L 25/03057; H04L 25/038893; H04L 25/49
See application file for complete search history.

(56) References Cited

U.S. PATENT DOCUMENTS

| 668,687 | A | 2/1901 | Mayer |
| 780,883 | A | 1/1905 | Hinchman |

(Continued)

FOREIGN PATENT DOCUMENTS

| CN | 1671092 | 9/2005 |
| CN | 1864346 | 11/2006 |

(Continued)

OTHER PUBLICATIONS

"Introduction to: Analog Computers and the DSPACE System," Course Material ECE 5230 Spring 2008, Utah State University, www.coursehero.com, 12 pages.

(Continued)

*Primary Examiner* — Freshteh N Aghdam
(74) *Attorney, Agent, or Firm* — Invention Mine, LLC

(57) ABSTRACT

Transmission of baseband and carrier-modulated vector codewords, using a plurality of encoders, each encoder configured to receive information bits and to generate a set of baseband-encoded symbols representing a vector codeword; one or more modulation circuits, each modulation circuit configured to operate on a corresponding set of baseband-encoded symbols, and using a respective unique carrier frequency, to generate a set of carrier-modulated encoded symbols; and, a summation circuit configured to generate a set of wire-specific outputs, each wire-specific output representing a sum of respective symbols of the carrier-modulated encoded symbols and at least one set of baseband-encoded symbols.

20 Claims, 16 Drawing Sheets

Related U.S. Application Data

(60) Provisional application No. 62/189,953, filed on Jul. 8, 2015, provisional application No. 62/185,403, filed on Jun. 26, 2015.

(52) U.S. Cl.
CPC .. *H04L 25/03057* (2013.01); *H04L 25/03898* (2013.01); *H04L 25/49* (2013.01)

(56) References Cited

U.S. PATENT DOCUMENTS

| | | |
|---|---|---|
| 3,196,351 A | 7/1965 | Slepian |
| 3,636,463 A | 1/1972 | Ongkiehong |
| 3,939,468 A | 2/1976 | Mastin |
| 4,163,258 A | 7/1979 | Ebihara |
| 4,181,967 A | 1/1980 | Nash |
| 4,206,316 A | 6/1980 | Burnsweig |
| 4,276,543 A | 6/1981 | Miller |
| 4,486,739 A | 12/1984 | Franaszek |
| 4,499,550 A | 2/1985 | Raylll |
| 4,722,084 A | 1/1988 | Morton |
| 4,772,845 A | 9/1988 | Scott |
| 4,774,498 A | 9/1988 | Traa |
| 4,864,303 A | 9/1989 | Ofek |
| 4,897,657 A | 1/1990 | Brubaker |
| 4,974,211 A | 11/1990 | Corl |
| 5,017,924 A | 5/1991 | Guiberteau |
| 5,053,974 A | 10/1991 | Penz |
| 5,150,384 A | 9/1992 | Cahill |
| 5,166,956 A | 11/1992 | Baltus |
| 5,168,509 A | 12/1992 | Nakamura |
| 5,266,907 A | 11/1993 | Dacus |
| 5,283,761 A | 2/1994 | Gillingham |
| 5,287,305 A | 2/1994 | Yoshida |
| 5,311,516 A | 5/1994 | Kuznicki |
| 5,331,320 A | 7/1994 | Cideciyan |
| 5,412,689 A | 5/1995 | Chan |
| 5,449,895 A | 9/1995 | Hecht |
| 5,459,465 A | 10/1995 | Kagey |
| 5,461,379 A | 10/1995 | Weinman |
| 5,510,736 A | 4/1996 | Van De Plassche |
| 5,511,119 A | 4/1996 | Lechleider |
| 5,553,097 A | 9/1996 | Dagher |
| 5,566,193 A | 10/1996 | Cloonan |
| 5,599,550 A | 2/1997 | Kohlruss |
| 5,626,651 A | 5/1997 | Dullien |
| 5,629,651 A | 5/1997 | Mizuno |
| 5,659,353 A | 8/1997 | Kostreski |
| 5,727,006 A | 3/1998 | Dreyer |
| 5,748,948 A | 5/1998 | Yu |
| 5,802,356 A | 9/1998 | Gaskins |
| 5,825,808 A | 10/1998 | Hershey |
| 5,856,935 A | 1/1999 | Moy |
| 5,875,202 A | 2/1999 | Venters |
| 5,945,935 A | 8/1999 | Kusumoto |
| 5,949,060 A | 9/1999 | Schattschneider |
| 5,982,954 A | 11/1999 | Delen |
| 5,995,016 A | 11/1999 | Perino |
| 6,005,895 A | 12/1999 | Perino |
| 6,084,883 A | 7/2000 | Norrell |
| 6,119,263 A | 9/2000 | Mowbray |
| 6,172,634 B1 | 1/2001 | Leonowich |
| 6,175,230 B1 | 1/2001 | Hamblin |
| 6,232,908 B1 | 5/2001 | Nakaigawa |
| 6,278,740 B1 | 8/2001 | Nordyke |
| 6,316,987 B1 | 11/2001 | Dally |
| 6,346,907 B1 | 2/2002 | Dacy |
| 6,359,931 B1 | 3/2002 | Perino |
| 6,378,073 B1 | 4/2002 | Davis |
| 6,384,758 B1 | 5/2002 | Michalski |
| 6,398,359 B1 | 6/2002 | Silverbrook |
| 6,404,820 B1 | 6/2002 | Postol |
| 6,417,737 B1 | 7/2002 | Moloudi |
| 6,424,630 B1 | 7/2002 | Ang |
| 6,433,800 B1 | 8/2002 | Holtz |
| 6,452,420 B1 | 9/2002 | Wong |
| 6,473,877 B1 | 10/2002 | Sharma |
| 6,483,828 B1 | 11/2002 | Balachandran |
| 6,504,875 B2 | 1/2003 | Perino |
| 6,509,773 B2 | 1/2003 | Buchwald |
| 6,522,699 B1 * | 2/2003 | Anderson ............ H04B 3/30 375/295 |
| 6,556,628 B1 | 4/2003 | Poulton |
| 6,563,382 B1 | 5/2003 | Yang |
| 6,621,427 B2 | 9/2003 | Greenstreet |
| 6,624,699 B2 | 9/2003 | Yin |
| 6,650,638 B1 | 11/2003 | Walker |
| 6,661,355 B2 | 12/2003 | Cornelius |
| 6,664,355 B2 | 12/2003 | Kim |
| 6,686,879 B2 | 2/2004 | Shattil |
| 6,690,739 B1 | 2/2004 | Mui |
| 6,766,342 B2 | 7/2004 | Kechriotis |
| 6,772,351 B1 | 8/2004 | Werner |
| 6,839,429 B1 | 1/2005 | Gaikwad |
| 6,839,587 B2 | 1/2005 | Yonce |
| 6,854,030 B2 | 2/2005 | Perino |
| 6,865,234 B1 | 3/2005 | Agazzi |
| 6,865,236 B1 | 3/2005 | Terry |
| 6,876,317 B2 | 4/2005 | Sankaran |
| 6,898,724 B2 | 5/2005 | Chang |
| 6,927,709 B2 | 8/2005 | Kiehl |
| 6,954,492 B1 | 10/2005 | Williams |
| 6,963,622 B2 | 11/2005 | Eroz |
| 6,972,701 B2 | 12/2005 | Jansson |
| 6,973,613 B2 | 12/2005 | Cypher |
| 6,976,194 B2 | 12/2005 | Cypher |
| 6,982,954 B2 | 1/2006 | Dhong |
| 6,990,138 B2 | 1/2006 | Bejjani |
| 6,993,311 B2 | 1/2006 | Li |
| 6,999,516 B1 | 2/2006 | Rajan |
| 7,023,817 B2 | 4/2006 | Kuffner |
| 7,039,136 B2 | 5/2006 | Olson |
| 7,053,802 B2 | 5/2006 | Cornelius |
| 7,075,996 B2 | 7/2006 | Simon |
| 7,080,288 B2 | 7/2006 | Ferraiolo |
| 7,082,557 B2 | 7/2006 | Schauer |
| 7,085,153 B2 | 8/2006 | Ferrant |
| 7,085,336 B2 | 8/2006 | Lee |
| 7,127,003 B2 | 10/2006 | Rajan |
| 7,130,944 B2 | 10/2006 | Perino |
| 7,142,612 B2 | 11/2006 | Horowitz |
| 7,142,865 B2 | 11/2006 | Tsai |
| 7,164,631 B2 | 1/2007 | Tateishi |
| 7,167,019 B2 | 1/2007 | Broyde |
| 7,176,823 B2 | 2/2007 | Zabroda |
| 7,180,949 B2 | 2/2007 | Kleveland |
| 7,184,483 B2 | 2/2007 | Rajan |
| 7,199,728 B2 | 4/2007 | Dally |
| 7,231,558 B2 | 6/2007 | Gentieu |
| 7,269,130 B2 | 9/2007 | Pitio |
| 7,269,212 B1 | 9/2007 | Chau |
| 7,335,976 B2 | 2/2008 | Chen |
| 7,336,112 B1 | 2/2008 | Sha |
| 7,339,990 B2 | 3/2008 | Hidaka |
| 7,346,819 B2 | 3/2008 | Bansal |
| 7,348,989 B2 | 3/2008 | Stevens |
| 7,349,484 B2 | 3/2008 | Stojanovic |
| 7,356,213 B1 | 4/2008 | Cunningham |
| 7,358,869 B1 | 4/2008 | Chiarulli |
| 7,362,130 B2 | 4/2008 | Broyde |
| 7,362,697 B2 | 4/2008 | Becker |
| 7,366,942 B2 | 4/2008 | Lee |
| 7,370,264 B2 | 5/2008 | Worley |
| 7,372,390 B2 | 5/2008 | Yamada |
| 7,389,333 B2 | 6/2008 | Moore |
| 7,397,302 B2 | 7/2008 | Bardsley |
| 7,400,276 B1 | 7/2008 | Sotiriadis |
| 7,428,273 B2 | 9/2008 | Foster |
| 7,456,778 B2 | 11/2008 | Werner |
| 7,462,956 B2 | 12/2008 | Lan |
| 7,496,162 B2 | 2/2009 | Srebranig |
| 7,570,704 B2 | 4/2009 | Nagarajan |
| 7,535,957 B2 | 5/2009 | Ozawa |

(56) References Cited

U.S. PATENT DOCUMENTS

| | | | |
|---|---|---|---|
| 7,539,532 B2 | 5/2009 | Tran | |
| 7,583,209 B1 | 9/2009 | Duan | |
| 7,599,390 B2 | 10/2009 | Pamarti | |
| 7,613,234 B2 * | 11/2009 | Raghavan | H04L 5/08 375/219 |
| 7,616,075 B2 | 11/2009 | Kushiyama | |
| 7,620,116 B2 | 11/2009 | Bessios | |
| 7,633,850 B2 | 12/2009 | Nagarajan | |
| 7,639,596 B2 | 12/2009 | Cioffi | |
| 7,643,588 B2 | 1/2010 | Visalli | |
| 7,650,525 B1 | 1/2010 | Chang | |
| 7,656,321 B2 | 2/2010 | Wang | |
| 7,694,204 B2 | 4/2010 | Schmidt | |
| 7,697,915 B2 | 4/2010 | Behzad | |
| 7,698,088 B2 | 4/2010 | Sul | |
| 7,706,456 B2 | 4/2010 | Laroia | |
| 7,706,524 B2 | 4/2010 | Zerbe | |
| 7,746,764 B2 | 6/2010 | Rawlins | |
| 7,768,312 B2 | 8/2010 | Hirose | |
| 7,787,572 B2 | 8/2010 | Scharf | |
| 7,804,361 B2 | 9/2010 | Lim | |
| 7,808,456 B2 | 10/2010 | Chen | |
| 7,808,883 B2 | 10/2010 | Green | |
| 7,841,909 B2 | 11/2010 | Murray | |
| 7,869,497 B2 | 1/2011 | Benvenuto | |
| 7,869,546 B2 | 1/2011 | Tsai | |
| 7,882,413 B2 | 2/2011 | Chen | |
| 7,899,653 B2 | 3/2011 | Hollis | |
| 7,907,676 B2 | 3/2011 | Stojanovic | |
| 7,933,770 B2 | 4/2011 | Kruger | |
| 8,000,664 B2 | 8/2011 | Khorram | |
| 8,030,999 B2 | 10/2011 | Chatterjee | |
| 8,036,300 B2 | 10/2011 | Evans | |
| 8,050,332 B2 | 11/2011 | Chung | |
| 8,055,095 B2 | 11/2011 | Palotai | |
| 8,064,535 B2 | 11/2011 | Wiley | |
| 8,085,172 B2 | 12/2011 | Li | |
| 8,091,006 B2 | 1/2012 | Prasad | |
| 8,106,806 B2 | 1/2012 | Toyomura | |
| 8,149,906 B2 | 4/2012 | Saito | |
| 8,159,375 B2 | 4/2012 | Abbasfar | |
| 8,159,376 B2 | 4/2012 | Abbasfar | |
| 8,180,931 B2 | 5/2012 | Lee | |
| 8,185,807 B2 | 5/2012 | Oh | |
| 8,199,849 B2 | 6/2012 | Oh | |
| 8,199,863 B2 | 6/2012 | Chen | |
| 8,218,670 B2 | 7/2012 | AbouRjeily | |
| 8,233,544 B2 | 7/2012 | Bao | |
| 8,245,094 B2 | 8/2012 | Jiang | |
| 8,253,454 B2 | 8/2012 | Lin | |
| 8,279,094 B2 | 10/2012 | Abbasfar | |
| 8,279,745 B2 | 10/2012 | Dent | |
| 8,289,914 B2 | 10/2012 | Li | |
| 8,295,250 B2 | 10/2012 | Gorokhov | |
| 8,295,336 B2 | 10/2012 | Lutz | |
| 8,305,247 B2 | 11/2012 | Pun | |
| 8,310,389 B1 | 11/2012 | Chui | |
| 8,341,492 B2 | 12/2012 | Shen | |
| 8,359,445 B2 | 1/2013 | Ware | |
| 8,365,035 B2 | 1/2013 | Hara | |
| 8,406,315 B2 | 3/2013 | Tsai | |
| 8,406,316 B2 | 3/2013 | Sugita | |
| 8,429,492 B2 | 4/2013 | Yoon | |
| 8,429,495 B2 | 4/2013 | Przybylski | |
| 8,437,440 B1 | 5/2013 | Zhang | |
| 8,442,099 B1 | 5/2013 | Sederat | |
| 8,442,210 B2 | 5/2013 | Zerbe | |
| 8,443,223 B2 | 5/2013 | Abbasfar | |
| 8,451,913 B2 | 5/2013 | Oh | |
| 8,462,891 B2 | 6/2013 | Kizer | |
| 8,472,513 B2 | 6/2013 | Malipatil | |
| 8,620,166 B2 | 6/2013 | Dong | |
| 8,498,344 B2 | 7/2013 | Wilson | |
| 8,498,368 B1 | 7/2013 | Husted | |
| 8,520,348 B2 | 8/2013 | Dong | |
| 8,520,493 B2 | 8/2013 | Goulahsen | |
| 8,539,318 B2 | 9/2013 | Cronie | |
| 8,547,272 B2 | 10/2013 | Nestler | |
| 8,577,284 B2 | 11/2013 | Seo | |
| 8,578,246 B2 | 11/2013 | Mittelholzer | |
| 8,588,254 B2 | 11/2013 | Diab | |
| 8,588,280 B2 | 11/2013 | Oh | |
| 8,593,305 B1 | 11/2013 | Tajalli | |
| 8,602,643 B2 | 12/2013 | Gardiner | |
| 8,604,879 B2 | 12/2013 | Mourant | |
| 8,638,241 B2 | 1/2014 | Sudhakaran | |
| 8,643,437 B2 | 2/2014 | Chiu | |
| 8,649,445 B2 | 2/2014 | Cronie | |
| 8,649,460 B2 | 2/2014 | Ware | |
| 8,674,861 B2 | 3/2014 | Matsuno | |
| 8,687,968 B2 | 4/2014 | Nosaka | |
| 8,711,919 B2 | 4/2014 | Kumar | |
| 8,718,184 B1 | 5/2014 | Cronie | |
| 8,755,426 B1 | 6/2014 | Cronie | |
| 8,773,964 B2 | 7/2014 | Hsueh | |
| 8,780,687 B2 | 7/2014 | Clausen | |
| 8,782,578 B2 | 7/2014 | Tell | |
| 8,831,440 B2 | 9/2014 | Yu | |
| 8,841,936 B2 | 9/2014 | Nakamura | |
| 8,879,660 B1 | 11/2014 | Peng | |
| 8,897,134 B2 | 11/2014 | Kern | |
| 8,898,504 B2 | 11/2014 | Baumgartner | |
| 8,938,171 B2 | 1/2015 | Tang | |
| 8,949,693 B2 | 2/2015 | Ordentlich | |
| 8,951,072 B2 | 2/2015 | Hashim | |
| 8,975,948 B2 | 3/2015 | GonzalezDiaz | |
| 8,989,317 B1 | 3/2015 | Holden | |
| 9,015,566 B2 | 4/2015 | Cronie | |
| 9,020,049 B2 | 4/2015 | Schwager | |
| 9,036,764 B1 | 5/2015 | Hossain | |
| 9,059,816 B1 | 6/2015 | Simpson | |
| 9,069,995 B1 | 6/2015 | Cronie | |
| 9,077,386 B1 | 7/2015 | Holden | |
| 9,083,576 B1 | 7/2015 | Hormati | |
| 9,093,791 B2 | 7/2015 | Liang | |
| 9,100,232 B1 | 8/2015 | Hormati | |
| 9,106,465 B2 | 8/2015 | Walter | |
| 9,124,557 B2 | 9/2015 | Fox | |
| 9,148,087 B1 | 9/2015 | Tajalli | |
| 9,152,495 B2 | 10/2015 | Losh | |
| 9,165,615 B2 | 10/2015 | Amirkhany | |
| 9,172,412 B2 | 10/2015 | Kim | |
| 9,178,503 B2 | 11/2015 | Hsieh | |
| 9,183,085 B1 | 11/2015 | Northcott | |
| 9,197,470 B2 | 11/2015 | Okunev | |
| 9,281,785 B2 | 3/2016 | Sjoland | |
| 9,288,082 B1 | 3/2016 | Ulrich | |
| 9,288,089 B2 | 3/2016 | Cronie | |
| 9,292,716 B2 | 3/2016 | Winoto | |
| 9,300,503 B1 | 3/2016 | Holden | |
| 9,306,621 B2 | 4/2016 | Zhang | |
| 9,331,962 B2 | 5/2016 | Lida | |
| 9,362,974 B2 | 6/2016 | Fox | |
| 9,363,114 B2 | 6/2016 | Shokrollahi | |
| 9,374,250 B1 | 6/2016 | Musah | |
| 9,401,828 B2 | 7/2016 | Cronie | |
| 9,432,082 B2 | 8/2016 | Ulrich | |
| 9,432,298 B1 | 8/2016 | Smith | |
| 9,444,654 B2 | 9/2016 | Hormati | |
| 9,455,744 B2 | 9/2016 | George | |
| 9,455,765 B2 | 9/2016 | Schumacher | |
| 9,461,862 B2 | 10/2016 | Holden | |
| 9,479,369 B1 | 10/2016 | Shokrollahi | |
| 9,509,437 B2 | 11/2016 | Shokrollahi | |
| 9,544,015 B2 | 1/2017 | Ulrich | |
| 9,634,797 B2 | 4/2017 | Benammar | |
| 9,667,379 B2 | 5/2017 | Cronie | |
| 2001/0006538 A1 | 7/2001 | Simon | |
| 2001/0055344 A1 | 12/2001 | Lee | |
| 2002/0034191 A1 | 3/2002 | Shattil | |
| 2002/0044316 A1 | 4/2002 | Myers | |
| 2002/0057592 A1 | 5/2002 | Robb | |
| 2002/0154633 A1 | 10/2002 | Shin | |
| 2002/0163881 A1 | 11/2002 | Dhong | |

(56) References Cited

U.S. PATENT DOCUMENTS

| | | |
|---|---|---|
| 2002/0167339 A1 | 11/2002 | Chang |
| 2002/0174373 A1 | 11/2002 | Chang |
| 2002/0181607 A1 | 12/2002 | Izumi |
| 2003/0016763 A1 | 1/2003 | Doi |
| 2003/0016770 A1* | 1/2003 | Trans .............. H04B 1/00 375/346 |
| 2003/0046618 A1 | 3/2003 | Collins |
| 2003/0085763 A1 | 5/2003 | Schrodinger |
| 2003/0146783 A1 | 8/2003 | Bandy |
| 2003/0174023 A1 | 9/2003 | Miyasita |
| 2003/0185310 A1 | 10/2003 | Ketchum |
| 2003/0218558 A1 | 11/2003 | Mulder |
| 2004/0027185 A1 | 2/2004 | Fiedler |
| 2004/0146117 A1 | 7/2004 | Subramaniam |
| 2004/0155802 A1 | 8/2004 | Lamy |
| 2004/0161019 A1* | 8/2004 | Raghavan .......... H04J 13/00 375/141 |
| 2004/0169529 A1 | 9/2004 | Afghahi |
| 2005/0063493 A1 | 3/2005 | Foster |
| 2005/0134380 A1 | 6/2005 | Nairn |
| 2005/0174841 A1 | 8/2005 | Ho |
| 2005/0195000 A1 | 9/2005 | Parker |
| 2005/0201491 A1 | 9/2005 | Wei |
| 2005/0213686 A1 | 9/2005 | Love |
| 2005/0220182 A1 | 10/2005 | Kuwata |
| 2005/0270098 A1 | 12/2005 | Zhang |
| 2006/0036668 A1 | 2/2006 | Jaussi |
| 2006/0097786 A1 | 5/2006 | Su |
| 2006/0103463 A1 | 5/2006 | Lee |
| 2006/0120486 A1 | 6/2006 | Visalli |
| 2006/0126751 A1 | 6/2006 | Bessios |
| 2006/0133538 A1 | 6/2006 | Stojanovic |
| 2006/0140324 A1 | 6/2006 | Casper |
| 2006/0159005 A1 | 7/2006 | Rawlins |
| 2006/0233291 A1 | 10/2006 | Garlepp |
| 2007/0001723 A1 | 1/2007 | Lin |
| 2007/0002954 A1 | 1/2007 | Cornelius |
| 2007/0030796 A1 | 2/2007 | Green |
| 2007/0076871 A1 | 4/2007 | Renes |
| 2007/0103338 A1 | 5/2007 | Teo |
| 2007/0121716 A1 | 5/2007 | Nagarajan |
| 2007/0182487 A1 | 8/2007 | Ozasa |
| 2007/0201546 A1 | 8/2007 | Lee |
| 2007/0204205 A1 | 8/2007 | Niu |
| 2007/0263711 A1 | 11/2007 | Kramer |
| 2007/0283210 A1 | 12/2007 | Prasad |
| 2008/0007367 A1 | 1/2008 | Kim |
| 2008/0012598 A1 | 1/2008 | Mayer |
| 2008/0104374 A1 | 5/2008 | Mohamed |
| 2008/0159448 A1 | 7/2008 | Anim-Appiah |
| 2008/0192621 A1 | 8/2008 | Suehiro |
| 2008/0317188 A1 | 12/2008 | Staszewski |
| 2009/0059782 A1 | 3/2009 | Cole |
| 2009/0115523 A1 | 5/2009 | Akizuki |
| 2009/0154604 A1 | 6/2009 | Lee |
| 2009/0195281 A1 | 8/2009 | Tamura |
| 2009/0262876 A1 | 10/2009 | Arima |
| 2009/0316730 A1* | 12/2009 | Feng .............. H04L 41/00 370/509 |
| 2009/0323864 A1 | 12/2009 | Tired |
| 2010/0046644 A1 | 2/2010 | Mazet |
| 2010/0081451 A1 | 4/2010 | Mueck |
| 2010/0148819 A1 | 6/2010 | Bae |
| 2010/0180143 A1 | 7/2010 | Ware |
| 2010/0215087 A1 | 8/2010 | Tsai |
| 2010/0215112 A1 | 8/2010 | Tsai |
| 2010/0235673 A1 | 9/2010 | Abbasfar |
| 2010/0271107 A1 | 10/2010 | Tran |
| 2010/0283894 A1 | 11/2010 | Horan |
| 2010/0296556 A1 | 11/2010 | Rave |
| 2010/0309964 A1 | 12/2010 | Oh |
| 2011/0014865 A1 | 1/2011 | Seo |
| 2011/0028089 A1 | 2/2011 | Komori |
| 2011/0032977 A1 | 2/2011 | Hsiao |
| 2011/0051854 A1 | 3/2011 | Kizer |
| 2011/0072330 A1 | 3/2011 | Kolze |
| 2011/0074488 A1 | 3/2011 | Broyde |
| 2011/0084737 A1 | 4/2011 | Oh |
| 2011/0103508 A1 | 5/2011 | Mu |
| 2011/0127990 A1 | 6/2011 | Wilson |
| 2011/0228864 A1 | 9/2011 | Aryanfar |
| 2011/0235501 A1 | 9/2011 | Goulahsen |
| 2011/0268225 A1 | 11/2011 | Cronie |
| 2011/0299555 A1 | 12/2011 | Cronie |
| 2011/0302478 A1 | 12/2011 | Cronie |
| 2011/0317559 A1 | 12/2011 | Kern |
| 2012/0082203 A1 | 4/2012 | Zerbe |
| 2012/0133438 A1 | 5/2012 | Tsuchi |
| 2012/0152901 A1 | 6/2012 | Nagorny |
| 2012/0161945 A1 | 6/2012 | Single |
| 2012/0213299 A1 | 8/2012 | Cronie |
| 2012/0257683 A1 | 10/2012 | Schwager |
| 2013/0010892 A1* | 1/2013 | Cronie ............. H04L 25/0276 375/296 |
| 2013/0013870 A1 | 1/2013 | Cronie |
| 2013/0106513 A1 | 5/2013 | Cyrusian |
| 2013/0114519 A1 | 5/2013 | Gaal |
| 2013/0114663 A1 | 5/2013 | Ding |
| 2013/0129019 A1 | 5/2013 | Sorrells |
| 2013/0147553 A1 | 6/2013 | Iwamoto |
| 2013/0188656 A1 | 7/2013 | Ferraiolo |
| 2013/0195155 A1 | 8/2013 | Pan |
| 2013/0202065 A1 | 8/2013 | Chmelar |
| 2013/0215954 A1 | 8/2013 | Beukema |
| 2013/0259113 A1 | 10/2013 | Kumar |
| 2013/0271194 A1 | 10/2013 | Pellerano |
| 2013/0307614 A1 | 11/2013 | Dai |
| 2013/0314142 A1 | 11/2013 | Tamura |
| 2013/0315501 A1 | 11/2013 | Atanassov |
| 2013/0346830 A1 | 12/2013 | Ordentlich |
| 2014/0159769 A1 | 6/2014 | Hong |
| 2014/0177645 A1 | 6/2014 | Cronie |
| 2014/0177696 A1 | 6/2014 | Hwang |
| 2014/0266440 A1 | 9/2014 | Itagaki |
| 2014/0269130 A1 | 9/2014 | Maeng |
| 2015/0049798 A1 | 2/2015 | Hossein |
| 2015/0070201 A1 | 3/2015 | Dedic |
| 2015/0078479 A1 | 3/2015 | Whitby-Strevens |
| 2015/0146771 A1 | 5/2015 | Walter |
| 2015/0222458 A1 | 8/2015 | Hormati |
| 2015/0236885 A1 | 8/2015 | Ling |
| 2015/0249559 A1 | 9/2015 | Shokrollahi |
| 2015/0333940 A1 | 11/2015 | Shokrollahi |
| 2015/0349835 A1 | 12/2015 | Fox |
| 2015/0380087 A1 | 12/2015 | Mittelholzer |
| 2015/0381232 A1 | 12/2015 | Ulrich |
| 2016/0020796 A1 | 1/2016 | Hormati |
| 2016/0020824 A1 | 1/2016 | Ulrich |
| 2016/0036616 A1 | 2/2016 | Holden |
| 2016/0197747 A1 | 7/2016 | Ulrich |
| 2016/0261435 A1 | 9/2016 | Musah |
| 2017/0310456 A1 | 10/2017 | Tajalli |
| 2017/0317449 A1 | 11/2017 | Shokrollahi |
| 2017/0317855 A1 | 11/2017 | Shokrollahi |

FOREIGN PATENT DOCUMENTS

| | | |
|---|---|---|
| CN | 101478286 | 7/2009 |
| CN | 101820288 | 9/2010 |
| CN | 101854223 | 10/2010 |
| EP | 1926267 | 5/2008 |
| EP | 2039221 | 2/2013 |
| JP | 2003163612 | 6/2003 |
| WO | 2005002162 | 1/2005 |
| WO | 2009084121 | 7/2009 |
| WO | 2010031824 | 3/2010 |
| WO | 2011119359 | 9/2011 |

OTHER PUBLICATIONS

Abbasfar, A., "Generalized Differential Vector Signaling", IEEE International Conference on Communications, ICC '09, (Jun. 14, 2009), pp. 1-5.

(56) References Cited

OTHER PUBLICATIONS

Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.
Burr, "Spherical Codes for M-ARY Code Shift Keying", University of York, Apr. 2, 1989, pp. 67-72, United Kingdom.
Cheng, W., "Memory Bus Encoding for Low Power: A Tutorial", Quality Electronic Design, IEEE, International Symposium on Mar. 26-28, 2001, pp. 199-204, Piscataway, NJ.
Clayton, P., "Introduction to Electromagnetic Compatibility", Wiley-Interscience, 2006.
Counts, L., et al., "One-Chip Slide Rule Works with Logs, Antilogs for Real-Time Processing," Analog Devices Computational Products 6, Reprinted from Electronic Design, May 2, 1985, 7 pages.
Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.
Design Brief 208 Using the Anadigm Multiplier CAM, Copyright 2002 Anadigm, 6 pages.
Ericson, T., et al., "Spherical Codes Generated by Binary Partitions of Symmetric Pointsets", IEEE Transactions on Information Theory, vol. 41, No. 1, Jan. 1995, pp. 107-129.
Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.
Grahame, J., "Vintage Analog Computer Kits," posted on Aug. 25, 2006 in Classic Computing, 2 pages, http://www.retrothing.conn/2006/08/classic_analog_.html.
Healey, A., et al., "A Comparison of 25 Gbps NRZ & PAM-4 Modulation used in Legacy & Premium Backplane Channels", DesignCon 2012, 16 pages.
International Search Report and Written Opinion for PCT/EP2011/059279 dated Sep. 22, 2011.
International Search Report and Written Opinion for PCT/EP2011/074219 dated Jul. 4, 2012.
International Search Report and Written Opinion for PCT/EP2012/052767 dated May 11, 2012.
International Search Report and Written Opinion for PCT/US14/052986 dated Nov. 24, 2014.
International Search Report and Written Opinion from PCT/US2014/034220 dated Aug. 21, 2014.
International Search Report and Written Opinion of the International Searching Authority, dated Jul. 14, 2011 in International Patent Application S.N. PCT/EP2011/002170, 10 pages.
International Search Report and Written Opinion of the International Searching Authority, dated Nov. 5, 2012, in International Patent Application S.N. PCT/EP2012/052767, 7 pages.
International Search Report for PCT/US2014/053563, dated Nov. 11, 2014, 2 pages.
Jiang, A., et al., "Rank Modulation for Flash Memories", IEEE Transactions of Information Theory, Jun. 2006, vol. 55, No. 6, pp. 2659-2673.
Loh, M., et al., "A 3×9 Gb/s Shared, All-Digital CDR for High-Speed, High-Density I/O", Matthew Loh, IEEE Journal of Solid-State Circuits, vol. 47, No. 3, Mar. 2012.
Notification of Transmittal of International Search Report and the Written Opinion of the International Searching Authority, for PCT/US2015/018363, dated Jun. 18, 2015, 13 pages.
Notification of Transmittal of the International Search Report and the Written Opinion of the International Searching Authority, or the Declaration for PCT/EP2013/002681, dated Feb. 25, 2014, 15 pages.
Notification of Transmittal of the International Search Report and the Written Opinion of the International Searching Authority, or the Declaration, dated Mar. 3, 2015, for PCT/US2014/066893, 9 pages.
Notification of Transmittal of the International Search Report and the Written Opinion of the International Searching Authority, or the Declaration, for PCT/US2014/015840, dated May 20, 2014. 11 pages.
Notification of Transmittal of the International Search Report and the Written Opinion of the International Searching Authority, or the Declaration, for PCT/US2014/043965, dated Oct. 22, 2014, 10 pages.
Notification of Transmittal of the International Search Report and the Written Opinion of the International Searching Authority, or the Declaration, for PCT/US2015/037466, dated Nov. 19, 2015.
Notification of Transmittal of the International Search Report and the Written Opinion of the International Searching Authority, or the Declaration, for PCT/US2015/039952, dated Sep. 23, 2015, 8 pages.
Notification of Transmittal of the International Search Report and the Written Opinion of the International Searching Authority, or the Declaration, for PCT/US2015/041161, dated Oct. 7, 2015, 8 pages.
Notification of Transmittal of the International Search Report and the Written Opinion of the International Searching Authority, or the Declaration, for PCT/US2015/043463, dated Oct. 16, 2015, 8 pages.
Oh, et al., Pseudo-Differential Vector Signaling for Noise Reduction in Single-Ended Signaling, DesignCon 2009.
Poulton, et al., "Multiwire Differential Signaling", UNC-CH Department of Computer Science Version 1.1, Aug. 6, 2003.
Schneider, J., et al., "ELEC301 Project: Building an Analog Computer," Dec. 19, 1999, 8 pages, http://www.clear.rice.edu/elec301/Projects99/anlgcomp/.
She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.
Skliar et al., A Method for the Analysis of Signals: the Square-Wave Method, Mar, 2008, Revista de Matematica: Teoria y Aplicationes, pp. 109-129.
Slepian, D., "Prennutation Modulation", IEEE, vol. 52, No. 3, Mar. 1965, pp. 228-236.
Stan, M., et al., "Bus-Invert Coding for Low-Power I/O, IEEE Transactions on Very Large Scale Integration (VLSI) Systems", vol. 3, No. 1, Mar. 1995, pp. 49-58.
Tallini, L., et al., "Transmission Time Analysis for the Parallel Asynchronous Communication Scheme", IEEE Transactions on Computers, vol. 52, No. 5, May 2003, pp. 558-571.
Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.
Wang et al., "Applying CDMA Technique to Network-on-Chip", IEEE Transactions on Very Large Scale Integration (VLSI) Systems, vol. 15, No. 10 (Oct. 1, 2007), pp. 1091-1100.
Zouhair Ben-Neticha et al, "The streTched"-Golay and other codes for high-SNR fnite-delay quantization of the Gaussian source at 1/2 Bit per sample, IEEE Transactions on Communications, vol. 38, No. 12 Dec. 1, 1990, pp. 2089-2093, XP000203339, ISSN: 0090-6678, DOI: 10.1109/26.64647.
Notification of Transmittal of the International Search Report and the Written Opinion of the International Searching Authority, or the Declaration, dated Feb. 15, 2017, 10 pages.
Notification of Transmittal of the International Search Report and the Written Opinion of the International Searching Authority, or the Declaration., for PCT/US17/14997, dated Apr. 7, 2017.
Holden, B., "Simulation results for NRZ, ENRZ & PAM-4 on 16-wire full-sized 400GE backplanes", IEEE 802.3 400GE Study Group, Sep. 2, 2013, 19 pages, www.ieee802.0rg/3/400GSG/publiv/13_09/holden_400_01_0913.pdf.
Holden, B., "An exploration of the technical feasibility of the major technology options for 400GE backplanes", IEEE 802.3 400GE Study Group, Jul. 16, 2013, 18 pages, http://ieee802.org/3/400GSG/public/13_07/holden_400_01_0713.pdf.
Holden, B., "Using Ensemble NRZ Coding for 400GE Electrical Interfaces", IEEE 802.3 400GE Study Group, May 17, 2013, 24 pages, http://www.ieee802.org/3/400GSG/public/13_05/holden_400_01_0513.pdf.

(56) References Cited

OTHER PUBLICATIONS

Reza Navid et al, "A 40 Gb/s Serial Link Transceiver in 28 nm CMOS Technology", IEEE Journal of Solid-State Circuits, vol. 50, No. 4. Apr. 2015, pp. 814-827.
Linten, D. et al, "T-Diodes—A Novel Plus-and-Play Wideband RF Circuit ESD Protection Methodology" EOS/ESD Symposium 07, pp. 242-249.
Hyosup Won et al, "A 28-Gb/s Receiver With Self-contained Adaptive Equalization and Sampling Point Control Using Stochastic Sigma-Tracking Eye-Opening Monitor", IEEE Transactions on Circuits and Systems-I: Regular Papers, vol. 64, No. 3, Mar. 2017. pp. 664-674.
Giovaneli, et al., "Space-frequency coded OFDM system for multi-wire power line communications", Power Line Communications and Its Applications, 20015 International Symposium on Vancouver, BC, Canada, Apr. 6-8, 2005, Piscataway, NJ, pp. 191-195.
Farzan, et al., "Coding Schemes for Chip-to-Chip Interconnect Applications", IEEE Transactions on Very Large Scale Integration (VLSI) Systems, vol. 14, pp. 393-406, Apr. 2006.
Anonymous, "Constant-weight code", Wikipedia.org, retrieved on Jun. 2, 2017.

\* cited by examiner

FIG. 15

HIGH SPEED COMMUNICATIONS SYSTEM

This application is a continuation of U.S. application Ser. No. 15/194,497, filed Jun. 27, 2016, entitled "High Speed Communications System", which is a Non-Provisional Application claiming priority under 35 USC § 119 to U.S. Provisional Application No. 62/189,953, filed Jul. 8, 2015, entitled "High Speed Communications System", and also claiming priority under 35 USC § 119 to U.S. Provisional Application 62/185,403, filed Jun. 26, 2015, entitled "High Speed Communications System," all of which are hereby incorporated herein by reference in their entirety for all purposes.

REFERENCES

The following references are herein incorporated by reference in their entirety for all purposes:

U.S. Patent Publication No. 2011/0268225 of U.S. patent application Ser. No. 12/784,414, filed May 20, 2010, naming Harm Cronie and Amin Shokrollahi, entitled "Orthogonal Differential Vector Signaling", hereinafter identified as [Cronie I];

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes", hereinafter identified as [Cronie II];

U.S. patent application Ser. No. 14/158,452, filed Jan. 17, 2014, naming John Fox, Brian Holden, Peter Hunt, John D Keay, Amin Shokrollahi, Richard Simpson, Anant Singh, Andrew Kevin John Stewart, and Giuseppe Surace, entitled "Chip-to-Chip Communication with Reduced SSO Noise", hereinafter identified as [Fox I];

U.S. patent application Ser. No. 13/842,740, filed Mar. 15, 2013, naming Brian Holden, Amin Shokrollahi and Anant Singh, entitled "Methods and Systems for Skew Tolerance in and Advanced Detectors for Vector Signaling Codes for Chip-to-Chip Communication", hereinafter identified as [Holden I];

U.S. Provisional Patent Application No. 61/934,804, filed Feb. 2, 2014, naming Ali Hormati and Amin Shokrollahi, entitled "Methods for Code Evaluation Using ISI Ratio", hereinafter identified as [Hormati I];

U.S. Provisional Patent Application No. 62/026,860, filed Jul. 21, 2014, naming Ali Hormati and Amin Shokrollahi, entitled "Multidrop Data Transfer", hereinafter identified as [Hormati II];

U.S. Provisional Patent Application No. 61/934,807, filed Feb. 2, 2014, naming Amin Shokrollahi, entitled "Vector Signaling Codes with High pin-efficiency and their Application to Chip-to-Chip Communications and Storage", hereinafter identified as [Shokrollahi I];

U.S. Provisional Patent Application No. 61/839,360, filed Jun. 23, 2013, naming Amin Shokrollahi, entitled "Vector Signaling Codes with Reduced Receiver Complexity", hereinafter identified as [Shokrollahi II].

U.S. Provisional Patent Application No. 61/946,574, filed Feb. 28, 2014, naming Amin Shokrollahi, Brian Holden, and Richard Simpson, entitled "Clock Embedded Vector Signaling Codes", hereinafter identified as [Shokrollahi III].

U.S. Provisional Patent Application No. 62/015,172, filed Jul. 10, 2014, naming Amin Shokrollahi and Roger Ulrich, entitled "Vector Signaling Codes with Increased Signal to Noise Characteristics", hereinafter identified as [Shokrollahi IV].

U.S. patent application Ser. No. 13/895,206, filed May 15, 2013, naming Roger Ulrich and Peter Hunt, entitled "Circuits for Efficient Detection of Vector Signaling Codes for Chip-to-Chip Communications using Sums of Differences", hereinafter identified as [Ulrich I].

"Controlled Intersymbol Interference Design Techniques of Conventional Interconnection Systems for Data Rates beyond 20 Gbps", Wendemagegnehu T. Beyene and Amir Amirkhany, IEEE Transactions on Advanced Packaging, Vol. 31 No. 4, pg. 731-740, November 2008, hereinafter identified as [Beyene].

TECHNICAL FIELD

The present invention relates to communications in general and in particular to the transmission of signals capable of conveying information and detection of those signals in wired communication.

BACKGROUND

In communication systems, a goal is to transport information from one physical location to another. It is typically desirable that the transport of this information is reliable, is fast and consumes a minimal amount of resources. Methods of information transport are broadly categorized into "baseband" methods that dedicate use of the physical communications channel to one transport method, and "broadband" methods that partition the physical communications channel in the frequency domain, creating two or more independent frequency channels upon which a transport method may be applied.

Baseband methods may be further categorized by physical medium. One common information transfer medium is the serial communications link, which may be based on a single wire circuit relative to ground or other common reference, multiple such circuits relative to ground or other common reference, or multiple such circuits used in relation to each other. A common example of the latter uses differential signaling ("DS"). Differential signaling operates by sending a signal on one wire and the opposite of that signal on a matching wire. The signal information is represented by the difference between the wires, rather than their absolute values relative to ground or other fixed reference.

Parallel data transfer is also commonly used to provide increased interconnection bandwidth, with busses growing from 16 or fewer wires, to 32, 64, and more. As crosstalk and noise induced on the parallel signal lines can produce receive errors, parity was added to improve error detection, and signal anomalies were addressed through active bus termination methods. However, these wide data transfer widths inevitably resulted in data skew, which became the limiting factor in increased bus data transfer throughput. Alternative approaches were developed utilizing narrower bus widths operating at much higher clock speeds, with significant effort placed on optimizing the transmission line characteristics of the interconnection medium, including use of impedance-controlled connectors and micro stripline wiring. Even so, the inevitable path imperfections required use of active equalization and inter-symbol interference (ISI) elimination techniques, including active pre-emphasis compensation for transmitters and Continuous Time Linear Equalization (CTLE) and Decision Feedback Equalization (DFE) for receivers, all of which increased the complexity and power consumption of the communications interface.

A number of signaling methods are known that maintain the desirable properties of DS, while increasing pin efficiency over DS. One such method is Vector signaling. With vector signaling, a plurality of signals on a plurality of wires is considered collectively although each of the plurality of signals might be independent. Thus, vector signaling codes can combine the robustness of single circuit DS and the high wire count data transfer throughput of parallel data transfer. Each of the collective signals in the transport medium carrying a vector signaling codeword is referred to as a component, and the number of plurality of wires is referred to as the "dimension" of the codeword (sometimes also called a "vector"). With binary vector signaling, each component or "symbol" of the vector takes on one of two possible values. With non-binary vector signaling, each symbol has a value that is a selection from a set of more than two possible values. The set of values that a symbol of the vector may take on is called the "alphabet" of the vector signaling code. A vector signaling code, as described herein, is a collection C of vectors of the same length N, called codewords. Any suitable subset of a vector signaling code denotes a "subcode" of that code. Such a subcode may itself be a vector signaling code. In operation, the coordinates of the codewords are bounded, and we choose to represent them by real numbers between −1 and 1. The ratio between the binary logarithm of the size of C and the length N is called the pin-efficiency of the vector signaling code. A vector signaling code is called "balanced" if for all its codewords the sum of the coordinates is always zero. Additional examples of vector signaling methods are described in Cronie I, Cronie II, Cronie III, Cronie IV, Fox I, Fox II, Fox III, Holden I, Shokrollahi I, Shokrollahi II, and Hormati I.

As previously described, broadband signaling methods partition the available information transfer medium in the frequency domain, creating two or more frequency-domain "channels" which may then may transport information in a comparable manner to baseband circuits, using known methods of carrier modulation to convert the baseband information into a frequency-domain channel signal. As each such channel can be independently controlled as to amplitude, modulation, and information encoding, it is possible to adapt the collection of channels to widely varying information transfer medium characteristics, including variations in signal loss, distortion, and noise over time and frequency.

Asymmetric Digital Subscriber Line or ADSL is one widely deployed broadband signaling method used to transport digital data over legacy copper telephony circuits. In ADSL, each of potentially several hundred frequency-domain channels is independently configured for amplitude, modulation method, and digital carrying capacity, based on the particular noise and loss characteristics of the copper circuit being used for transport.

BRIEF DESCRIPTION

Communication of digital information using a combination of baseband and broadband techniques over multiple wires is described. A four wire communications channel having 35 dB of attenuation at 37.5 GHz is used in provided examples as a typical transport medium for use with the systems and methods described herein. One embodiment creates two frequency-based channels over the transport medium, with each channel using a combination of a vector signaling code and duobinary encoding to transport sets of three data bits over four wires at an effective rate of 56 Gigabits per second per wire.

BRIEF DESCRIPTION OF FIGURES

FIG. 15 shows the distribution of data bits and redundancy-augmented bits across the six subchannels and multiple sequential transmit unit intervals, as described relevant to the ninth and tenth embodiments of the invention.

DETAILED DESCRIPTION

Interconnection has long been a limiting factor in the design of large digital systems. Whether at the level of modules interconnected by a backplane, or of functional subsystems interconnected within a large printed circuit board, the need for reliable, error free, high-speed digital interconnection has constantly pushed the limits of available technology to its limits.

Figure 1:
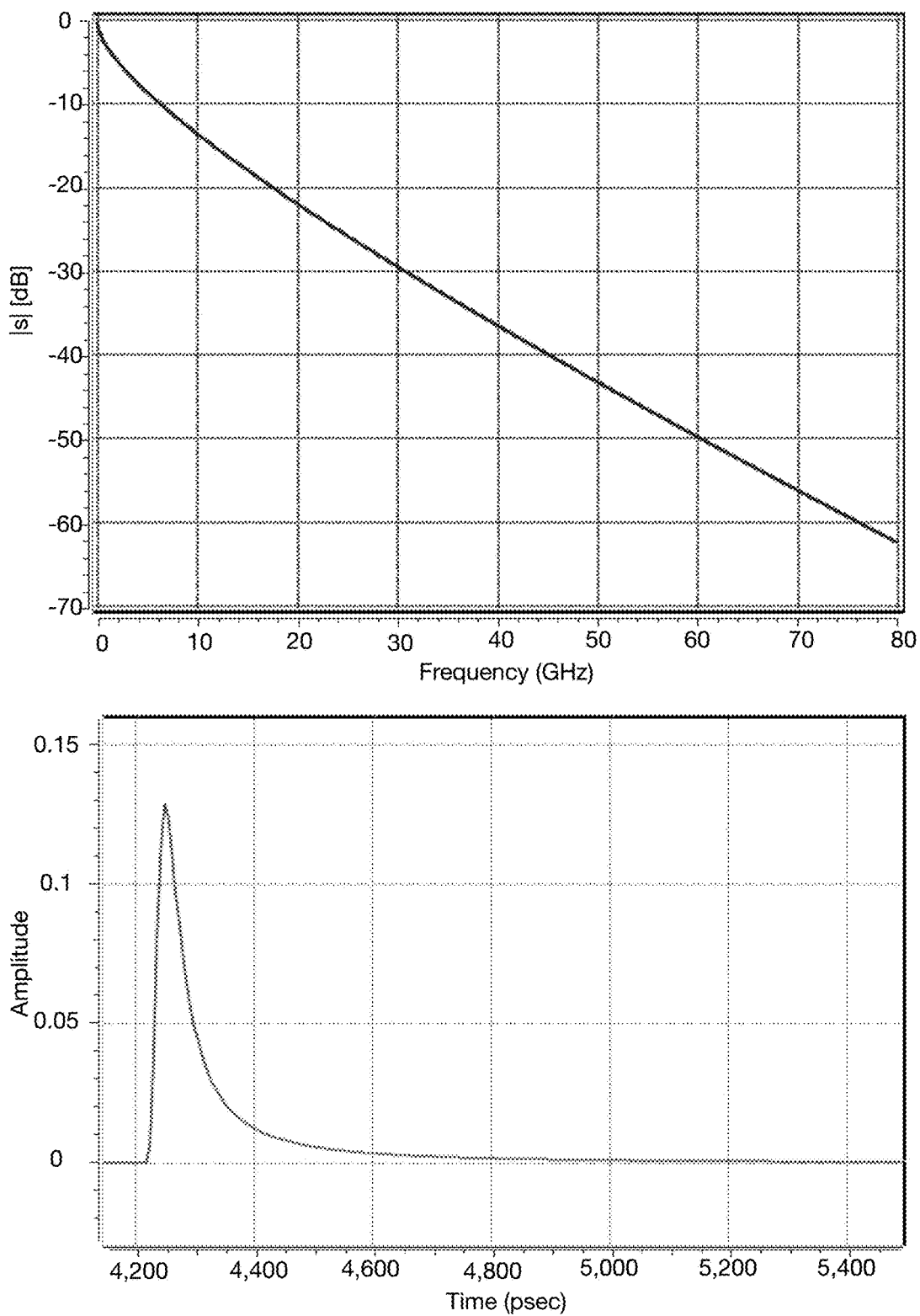
FIG. 1 illustrates the frequency-domain and time-domain characteristics of the transport channel model used herein.

The systems and methods described herein provide robust, reliable transfer of data between at least one transmitting device and at least one receiving device, at data rates of at least 50 Gigabits per second per interconnection wire. An example channel model having the frequency- and time-domain characteristics illustrated in FIG. 1 will be used. It will be obvious to one familiar with the art that such a transport channel is incompatible with conventional communication signaling methods; for example, straightforward NRZ signaling at an example 112 Gibabits/second has a Nyquist frequency of 56 GHz, corresponding to an intractable 46 dB attenuation over the proposed physical transport channel.

This proposed data rate also strains integrated circuit data processing capabilities within the attached transmitting and receiving devices. It is therefore presumed that high-speed data handling in these devices will be distributed across multiple parallel processing "phases". As one example, rather than a single data path handling data at 100 Gigabits per second (i.e. with merely 10 picosecond between bits), the same data stream may be distributed across sixteen processing phases, each one thus having a more reasonable 160 picoseconds of processing time per bit. However, this added processing time comes at the cost of significantly increased complexity from the additional processing elements. This distribution of processing also can lead to increased latency before a given digital bit result becomes available, limiting the ability to utilize that result in predicting a subsequent bit result, which is the basis of the DFE method.

The increasing data transfer rates also lead to physical issues as the wavelength of the propagating signals on the interconnection shrinks. As one example, the propagating signal wavelength at 56 Gigahertz on a printed circuit micro stripline is approximately 4 millimeters, thus periodic anomalies with merely fractional wavelength dimensions (even including the weave of the impregnated fabric comprising the circuit board) may represent a significant disturbance to signal integrity, stressing available equalization and compensation methods.

Encoding Information Using Hadamard Transforms

As taught in [Cronie I], the Hadamard Transform, also known as the Walsh-Hadamard transform, is a square matrix of entries +1 and −1 so arranged that both all rows and all columns are mutually orthogonal. Hadamard matrices are known for all sizes 2N as well as for selected other sizes. In particular, the description herein utilizes the 4×4 Hadamard matrix as the example encoder.

The order 4 Hadamard matrix used in our examples is:

$$H_4 = \begin{bmatrix} +1 & +1 & +1 & +1 \\ +1 & -1 & +1 & -1 \\ +1 & +1 & -1 & -1 \\ +1 & -1 & -1 & +1 \end{bmatrix} \quad \text{(Eqn. 1)}$$

and encoding of the three informational bits A, B, C may be obtained by multiplying those informational bits times the rows 2, 3, and 4 of the Hadamard matrix $H_4$ to obtain four output values, subsequently called "symbol values". By convention, the results are scaled by an appropriate constant factor so as to bound the symbol values to the range +1 to −1. It may be noted that the first row of $H_4$ corresponds to common mode signaling, which is not used herein, with the next three vectors being used to encode bits A, B, and C respectively into outputs W, X, Y, Z, these vectors also being called "modes" or "subchannels" of the Hadamard code. As the encoded outputs simultaneously carry information derived from the encoding of A, B, and C, the outputs will be a superposition or summation of modes, i.e. a sum of the sub-channel code vectors of the vector signaling code.

One familiar with the art will note that all possible values of A, B, C encoded in this manner result in mode summed values for W, X, Y, Z which are balanced; that is, summing to the constant value zero. If the mode summed values for W, X, Y, Z are scaled such that their maximum absolute value is 1 (that is, the signals are in the range +1 to −1 for convenience of description) it will be noted that all achievable values are permutations of the vector (+1, −⅓, −⅓, −⅓) or of the vector (−1, ⅓, ⅓, ⅓). These are called the codewords of the vector signaling code H4. As used herein, this H4 code will subsequently be called Ensemble NRZ code or ENRZ and will be used as a representative example of vector signaling code in subsequent examples, without implying limitation.

ENRZ

[Hormati I] teaches that ENRZ has optimum Inter Symbol Interference (ISI) characteristics, and [Holden I] and [Ulrich I] teach it is capable of efficient detection. As previously described, ENRZ encodes three binary data bits into a four-symbol codeword for transmission, as one example, over four wires of a transport medium. If ENRZ signaling is used over four wires of the proposed channel, the data transfer rate may be achieved with merely a 75 Gigasymbol/second signaling rate, equivalent to 112 Gbps per wire pair, for the two pair transport channel.

Figure 2:
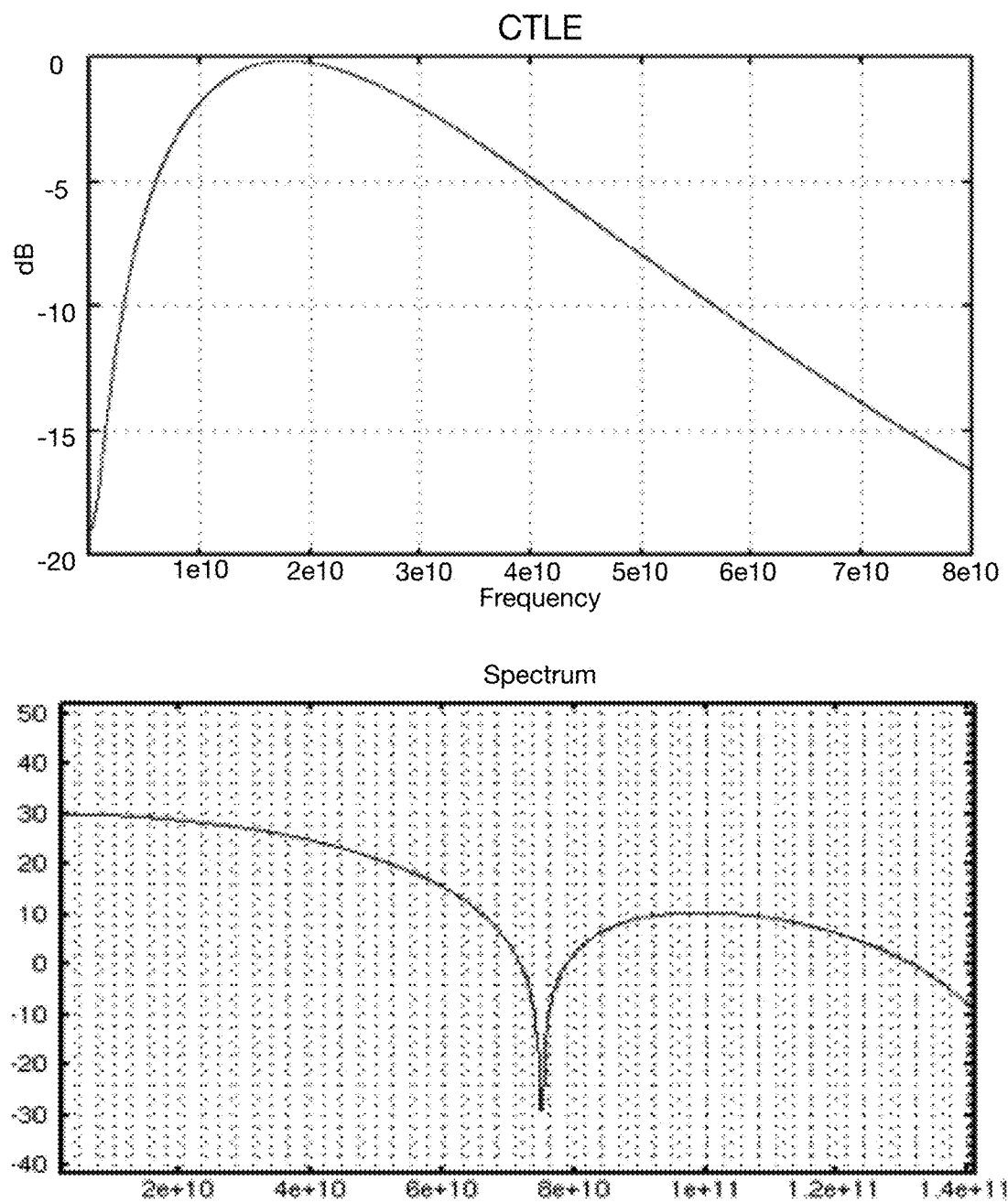
FIG. 2 shows the simulated CTLE gain and transmit spectrum of a first embodiment using ENRZ signaling over a two pair (four wire) transport channel.
Figure 3:
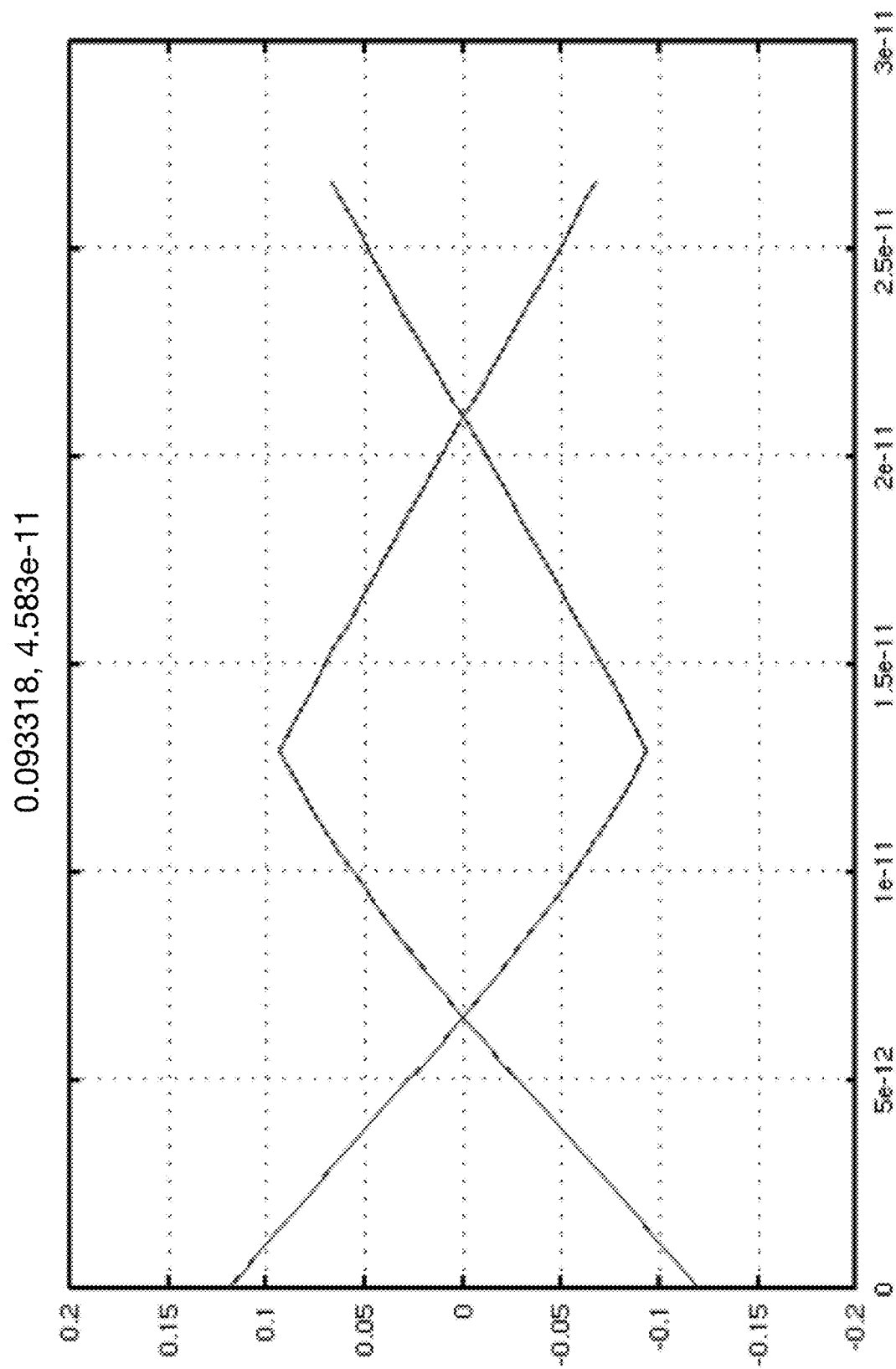
FIG. 3 shows the simulated receive eye opening for the first embodiment.

Simulation of a first embodiment combining ENRZ signaling at a 75 Gigasymbol/second rate with the reference channel model indicates that a two tap FFE (transmit Feed-Forward Equalization) may be combined with receiver continuous-time linear equalization (CTLE) and a 12 tap Decision Feedback Equalizer (DFE), with performance as illustrated in the graphs of FIG. 2. The receive eye simulation of FIG. 3 shows a 93 mV vertical eye opening and a 14.5 psec edge-to-edge horizontal eye opening.

Duobinary Encoding

Duobinary encoding is a solution known in the art in which consecutive bits of a serially transmitted data stream are processed to shape and constrain the resulting transmit data spectrum. It is well known that Inter-Symbol Interference (ISI) such as may be produced by transmission medium perturbations will result in the received amplitude of a signal in one unit interval to be perturbed by residual energy from previous unit intervals. As one example, inverted pulse reflections from a perturbation of the transmission medium will cause a received signal to be reduced by the residual influence of previously transmitted signals. Thus, a transmitter informed of this effect might combine a presently transmitted signal value with that of a previous transmission, in an attempt to anticipate or pre-compensate for this inter-symbol interference effect. Thus, use of partial response codes such as duobinary are often described as a particular form of pre-equalization filtering intended to produce constructive ISI, rather than as a literal data encoding means.

As described in [Beyene], other partial-response codes are known to have comparable ISI management capabilities. For reference purposes, the characteristic equations defining these encodings or filterings are listed in Table I.

TABLE I

| Partial Response System | Characteristic Equation |
| --- | --- |
| Duobinary | $x_n + x_{n-1}$ |
| Dicode | $x_n - x_{n-1}$ |
| Modified Duobinary | $x_n - x_{n-2}$ |
| Class 2 | $x_n + 2x_{n-1} + x_{n-2}$ |

Unless otherwise described, as used herein the duobinary processing performed is assumed to be a summation of the present and immediately previous transmit unit interval signal, each scaled by a factor of 0.5. Optionally, this may be combined with a transmit lowpass filter to further control the transmit spectrum. In other embodiments, ISI-controlling encoding is combined in any order with Hadamard encoding, where the ISI-controlling encoding is any of duobinary, modified duobinary, dicode, class2, or a Hamming filter as subsequently described. In such embodiments, the ISI-controlling encoding may also be described as being performed by a partial response encoder, embodying any of the partial response encodings or filterings above.

If the characteristics of the communications channel are extremely well understood, it may be possible to configure the ISI-controlling operation of the transmitter such that no explicit complementary operation is required at the receiver, the effective action of the channel characteristics themselves serving to perform the inverse operation. Other embodiments may explicitly detect, as one example, the ternary signals produced by duobinary encoding of binary data, followed by an explicit duobinary to binary decoding operation. Alternatively, commonly used receiver ISI elimination techniques such as DFE will also efficiently address the effects of such transmitter ISI compensation. As each example receiver in this document already incorporates DFE, no further receiver duobinary (or other partial response code) processing will be shown.

Figure 4:
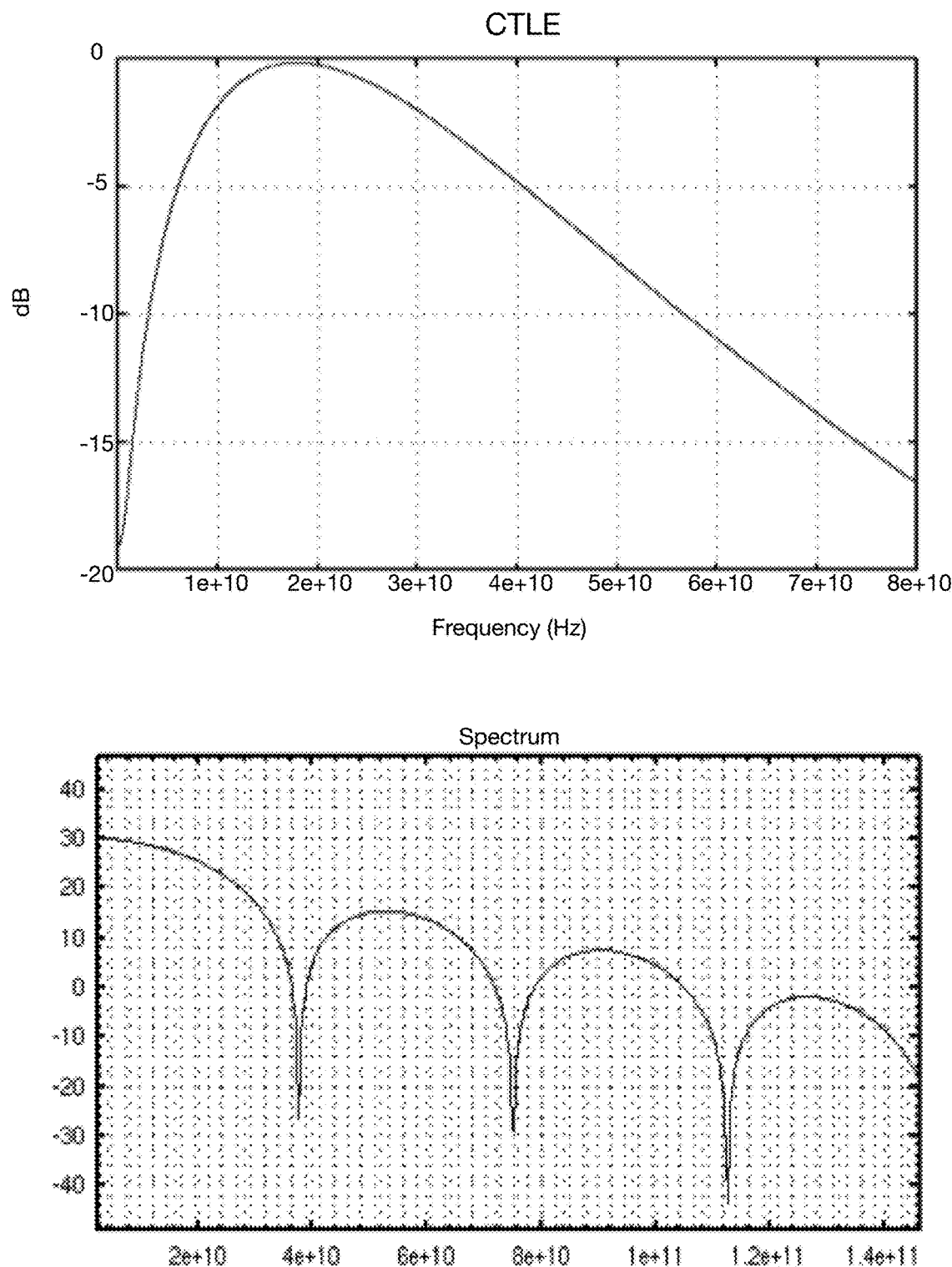
FIG. 4 shows the simulated CTLE gain and transmit spectrum of a second embodiment using ENRZ signaling combined with duobinary encoding over a two pair (four wire) transport channel.
Figure 5:
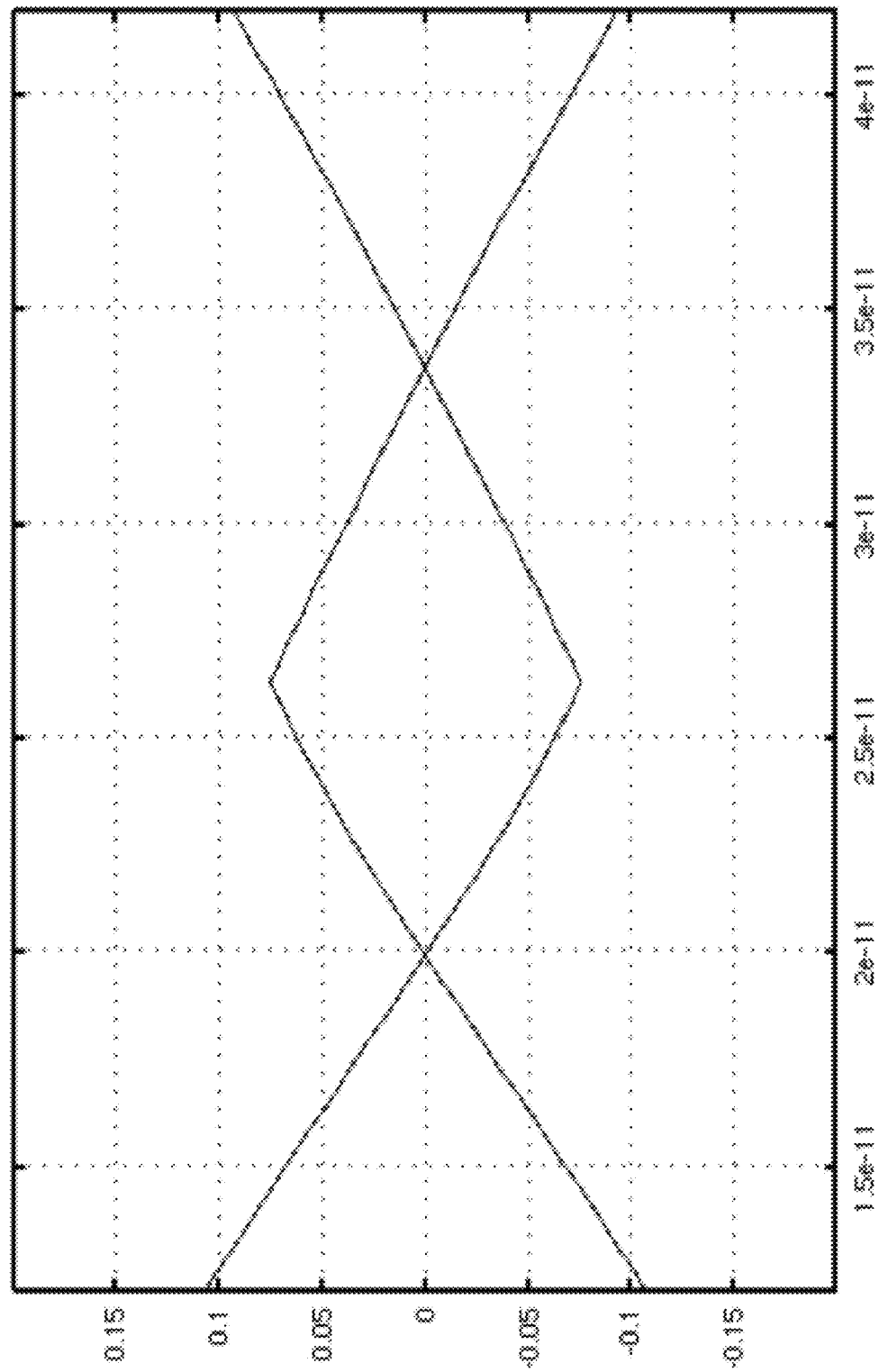
FIG. 5 shows the simulated receive opening for the second embodiment.

A second embodiment incorporating ENRZ encoding at a 75 Gigasymbol/second rate, subsequent duobinary processing of each wire signal, a 2 tap FFE, CTLE, and a 12 tap DFE was simulated using the reference channel model, producing the CTLE gain and spectrum results shown in FIG. 4. The receive eye simulation shown in FIG. 5 shows a 75 mV vertical receive eye opening and a 13.7 psec edge-to-edge horizontal eye opening.

These results, although representing considerable improvement over straightforward NRZ data transmission, indicate additional work is needed.

Channelization

If purely baseband communications solutions are insufficient, might a broadband approach be of benefit? Historically, such significant levels of physical transport channel limitation had been seen and addressed before, albeit at far lower data rates, during the efforts to provide high speed digital services over the legacy copper wire infrastructure of the telephony network. For DSL at its desired 3 Megabit data rate, a propagating signal wavelength was several hundred meters, which correlated strongly with the typical spacing of wire stubs, splices, and insulation abrasions seen in the field. Thus, an uncompensated frequency response for a typical copper telephony signal path would exhibit numerous notches and slopes caused by reflective interference among those anomalies, dissipative attenuation from degraded wires and insulation, and intrusive noise from sources such as AM radio transmitters.

Ultimately, multichannel frequency domain channelization was used to constrain the effect of those legacy transport issues. One commonly deployed Asymmetric Digital Subscriber Line (ADSL) solution, for example, partitioned the approximate 1 MHz of available transport medium bandwidth into 4.3125 kHz channels. Each channel was then independently tested for attenuation and signal-to-noise ratio, with different data throughput rates assigned to each channel depending on those test results. Thus, a channel frequency coinciding with a frequency response notch or significant external noise source would not be used, while other channels not presenting those issues could be used at full capacity. Unfortunately, the generation and detection of such a high channel count protocol relies on the availability of inexpensive digital signal processing solutions, and such technology has scaled in performance over time by perhaps a factor of ten, versus the approximate factor of 100,000 data rate increase in the present application.

Thus, although the present channel attenuation issues suggest a broadband approach may be useful, the conventional high-channel-count embodiment methods known to the art are incompatible with the anticipated data rate. A new approach specifically designed for high speed processing will be required.

Broadband Duo Binary ENRZ

A third embodiment combines ENRZ, duobinary, and a two frequency-domain channel approach to address the issues of the previous proposals. The first frequency channel is at baseband, i.e. comparable to the single channel of the previous embodiment. The second frequency channel is composed of the same ENRZ+duobinary signaling modulating a sinusoidal carrier, chosen to minimize the frequency overlap between spectral components of the baseband and of the carrier channel.

In the following example, a carrier frequency of 37.5 GHz will be used, with no limitation implied. Comparable results have been obtained in simulations using a 30 GHz carrier frequency, and lower frequencies may be used with improved channel attenuation characteristics but somewhat higher inter-channel interference, as will be shown in a subsequent example.

Both frequency channels run at a signaling rate of 37.5 Gsymbols/second, with three data bits being transported over the four wires of the baseband channel, and a second three data bits being transported over the same four wires using the carrier channel, to produce an aggregate throughput equal to the previous embodiments. With the same data throughput distributed across two channels, the required signaling rate per channel is halved, thus potentially allowing a much wider horizontal eye opening.

Figure 6:
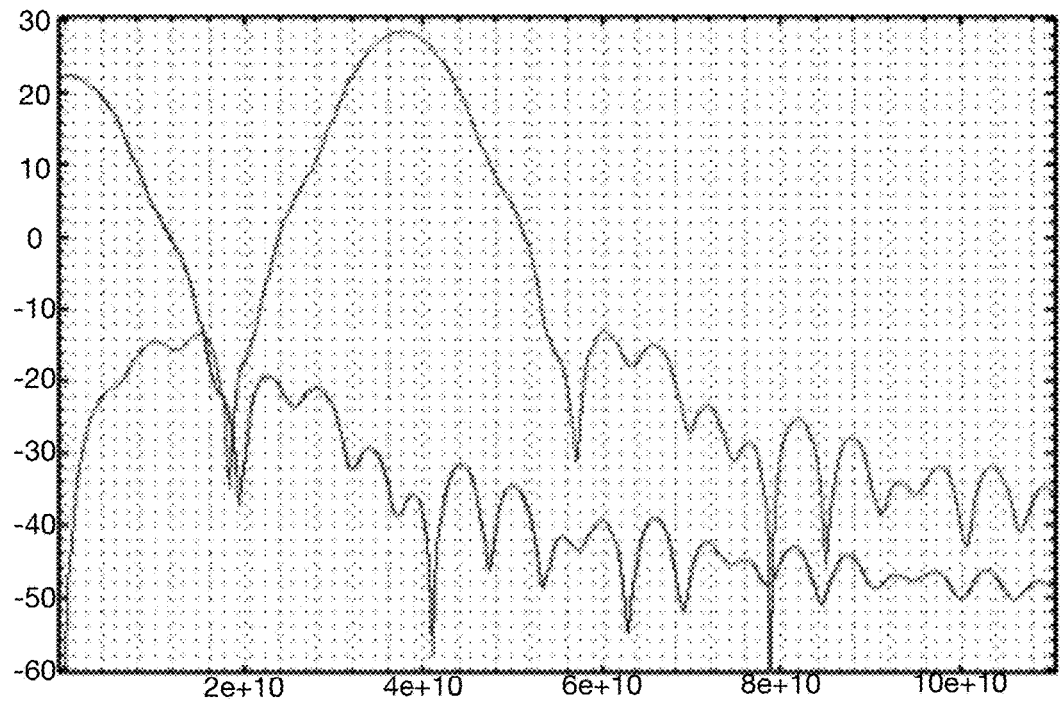
FIG. 6 illustrates the spectrums of the broadband and carrier channels for the described third embodiment.
Figure 6:
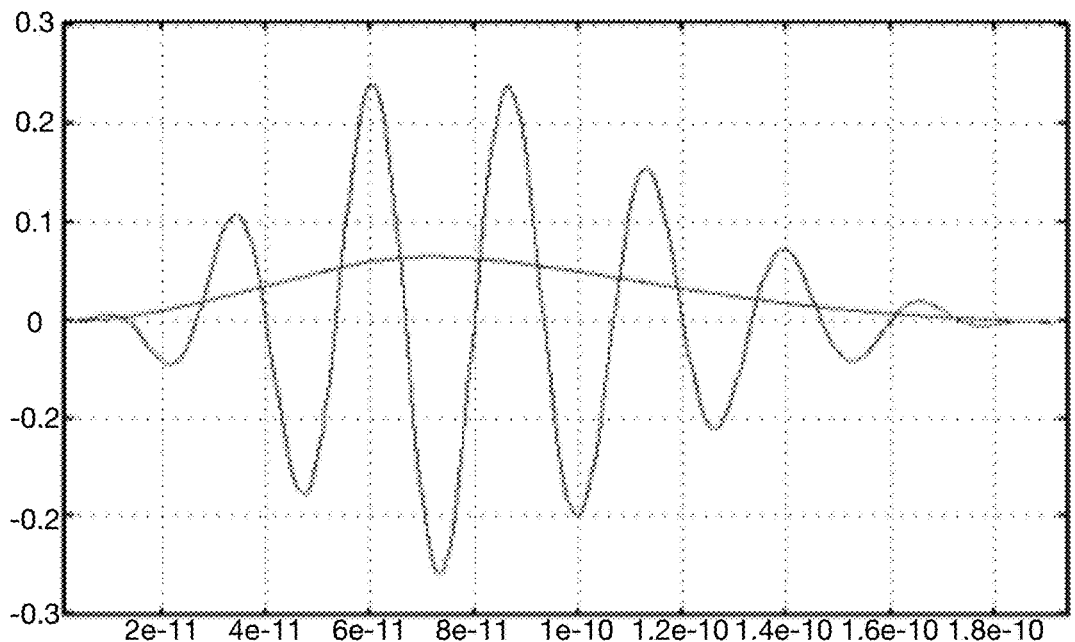

FIG. 6 illustrates the spectrums of the broadband and carrier channels and the corresponding pulse shapes of the two channel signals, as produced by a simulation of this embodiment operating over the reference channel model.

In this embodiment, data for each of the two channels is separately ENRZ encoded, and then each of the four signaling streams carrying the ENRZ codewords is duobinary encoded by summing the present and immediately previous Unit Interval's value, each scaled by a factor of 0.5. (Alternatively, the summation of the values may subsequently be scaled by the same factor, or the scaling may be subsumed into later amplification and/or filtering functions.) Each of the two resulting duobinary encoded streams, herein also referred to as sets of baseband-encoded symbols, are pre-emphasized using a two tap FFE, then passed through a Butterworth lowpass filter of order 2 with a cutoff frequency of 9.37 Gigahertz for spectral shaping and ICI reduction. The filtered stream for the carrier channel modulates a sinusoidal carrier at 37.5 GHz, the result of which is linearly combined with the filtered stream for the baseband channel for transmission over the transport channel.

As the subchannels of a Hadamard code such as ENRZ are linear, that is, they transparently communicate non-binary as well as binary signals, the order in which duobinary and ENRZ encoding is performed may be reversed. In at least one such alternative embodiment, each of the three data bits is separately duobinary encoded before being presented to the ENRZ encoder, rather than the ENRZ code outputs being duobinary encoded, for each of the baseband and carrier channels.

Transmitter

Figure 9:
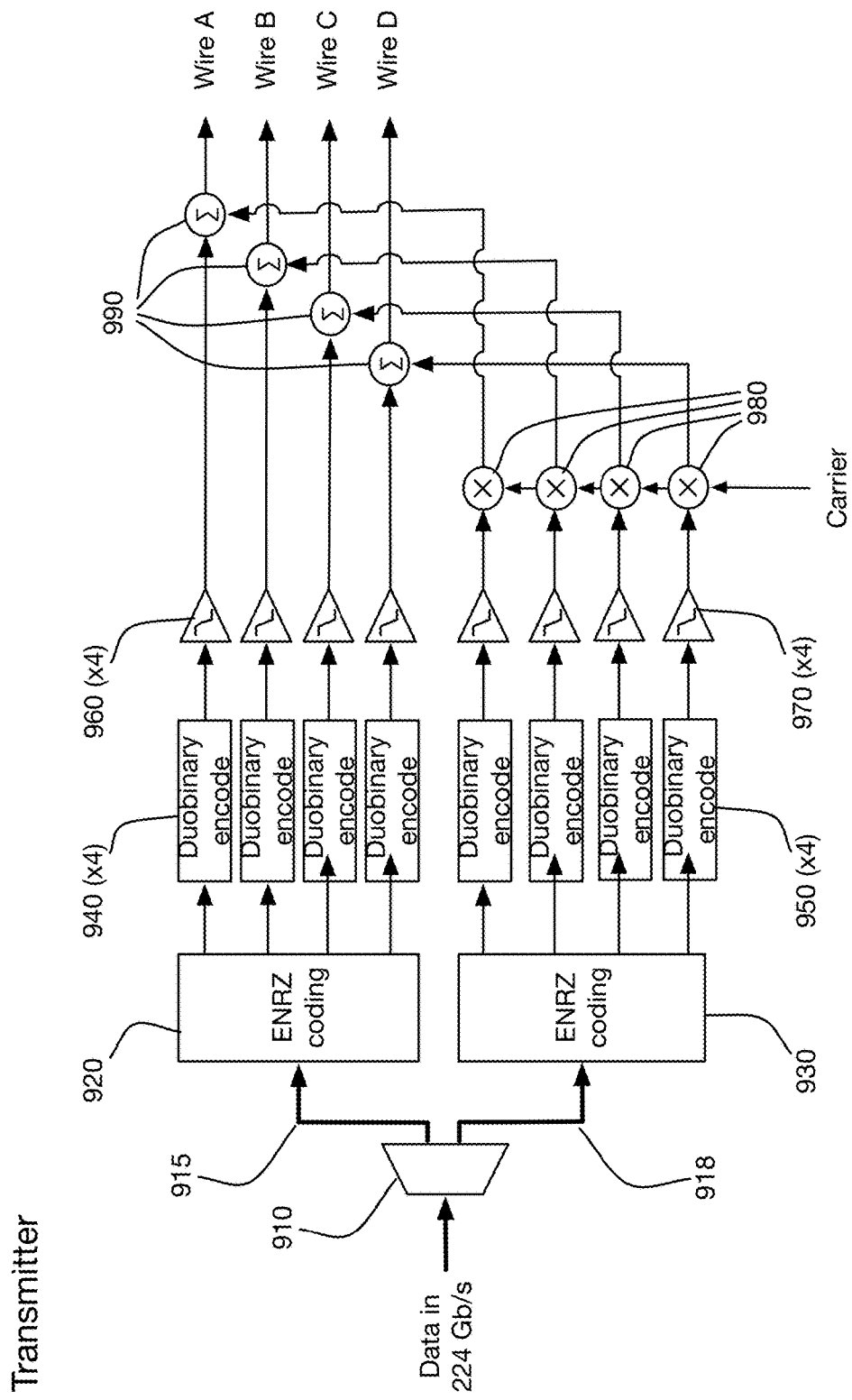
FIG. 9 is a block diagram of a transmitter embodiment combining baseband and carrier band signaling.

FIG. 9 is a block diagram of one embodiment of a Broadband Duobinary ENRZ transmitter. Data at an aggregate rate of 224 Gigabits/second enters MUX 910, which separates it into two independent data streams 915 and 918, each of 112 Gigabits/second that serve as data inputs to the baseband and carrier channels.

The baseband channel data is ENRZ encoded 920, with each three bits of input data producing one code word of four symbol values. Each baseband symbol value will subsequently be processed independently and ultimately transported (along with its comparable carrier channel processed symbol value) on its own wire. Processing for each baseband symbol value may include duobinary encoding by partial-response signaling encoder 940 and low-pass filtering and amplification by amplifier 960 as needed to meet system signal level criteria, to produce a processed baseband output. In some embodiments, the partial response signaling encoder may be implemented with two sets of analog voltage generators, where each set is alternately driven with a codeword input and provides a set of voltages representing the codeword symbols, but the generators maintain their outputs for a duration of two signaling intervals. The sets of voltages are summed at a signal summing circuit. While each set of voltages changes at ½ the symbol rate, because they are staggered in time, the outputs of the summing circuit change at the symbol rate, and represent the sum of the current symbol and the prior symbol. In some embodiments, the encoder such as ENRZ encoder 920 may comprise two encoders also operating at ½ rate, each encoder configured to drive a corresponding set of analog voltage generators.

Processing for the carrier channel is comparable to that of the baseband channel to the point of carrier modulation, with carrier channel data 918 being ENRZ encoded 930, with each three bits of input data producing one codeword of four symbol values. Each carrier symbol value will subsequently be processed independently, and then mixed with its comparable processed baseband symbol value for wire transmission. Processing for each carrier symbol value consists of duobinary encoding 950, low-pass filtering and amplification 970 as needed to meet system signal level criteria, and modulation 980 of the 37.5 GHz Carrier to produce a processed and modulated carrier output.

Each of the four processed baseband outputs is summed 990 with its comparable processed and modulated carrier outputs, producing wire outputs identified in FIG. 9 as Wire A, Wire B, Wire C, and Wire D.

Figure 10:
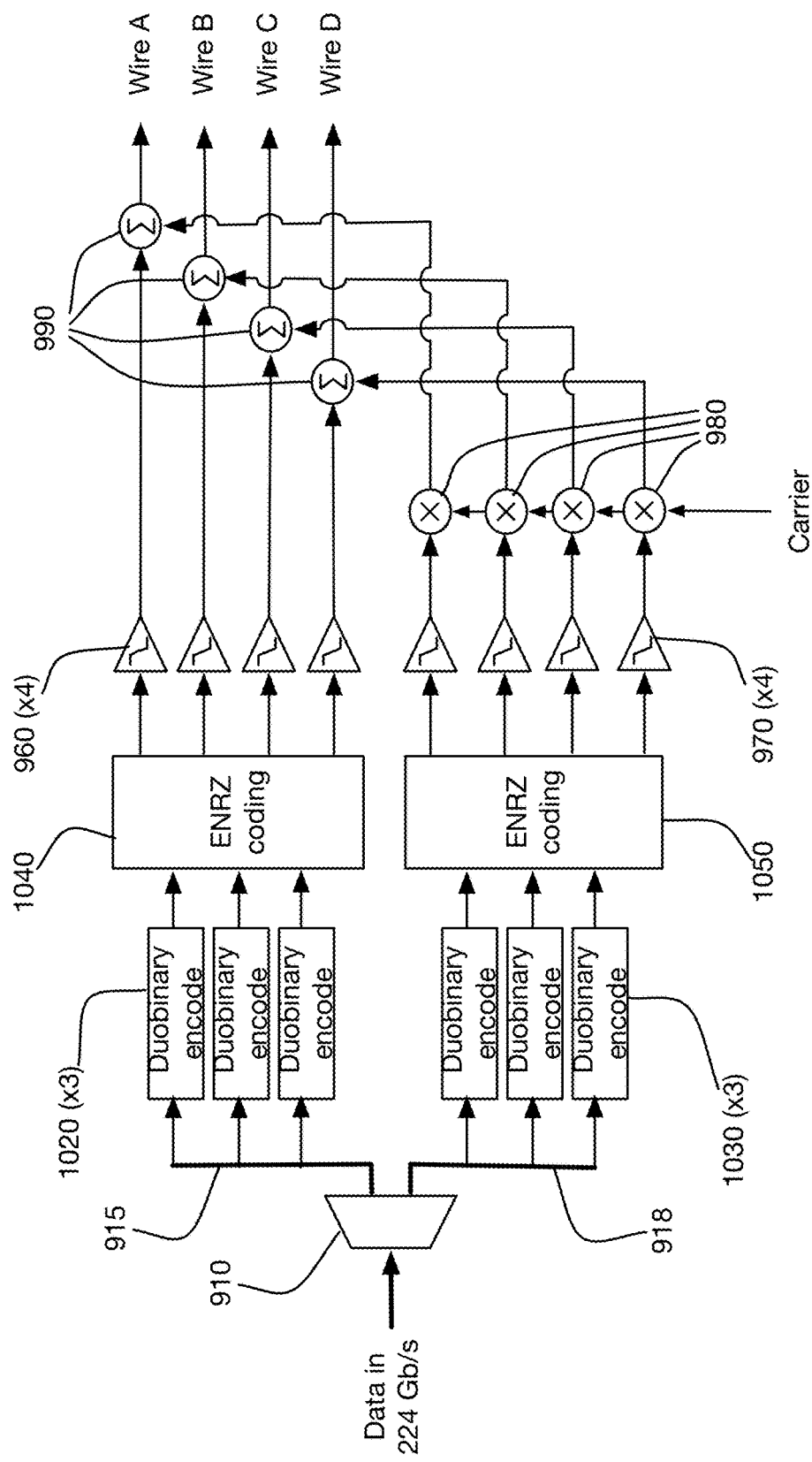
FIG. 10 is a block diagram of an alternative transmitter embodiment combining baseband and carrier band signaling.

FIG. 10 shows an alternative transmitter embodiment, in which duobinary encoding 1020 and 1030 is performed prior to ENRZ encoding 1040 and 1050. Other than the order of these operations, this alternative transmitter is identical to that of the embodiment of FIG. 9.

Receiver

Figure 11:
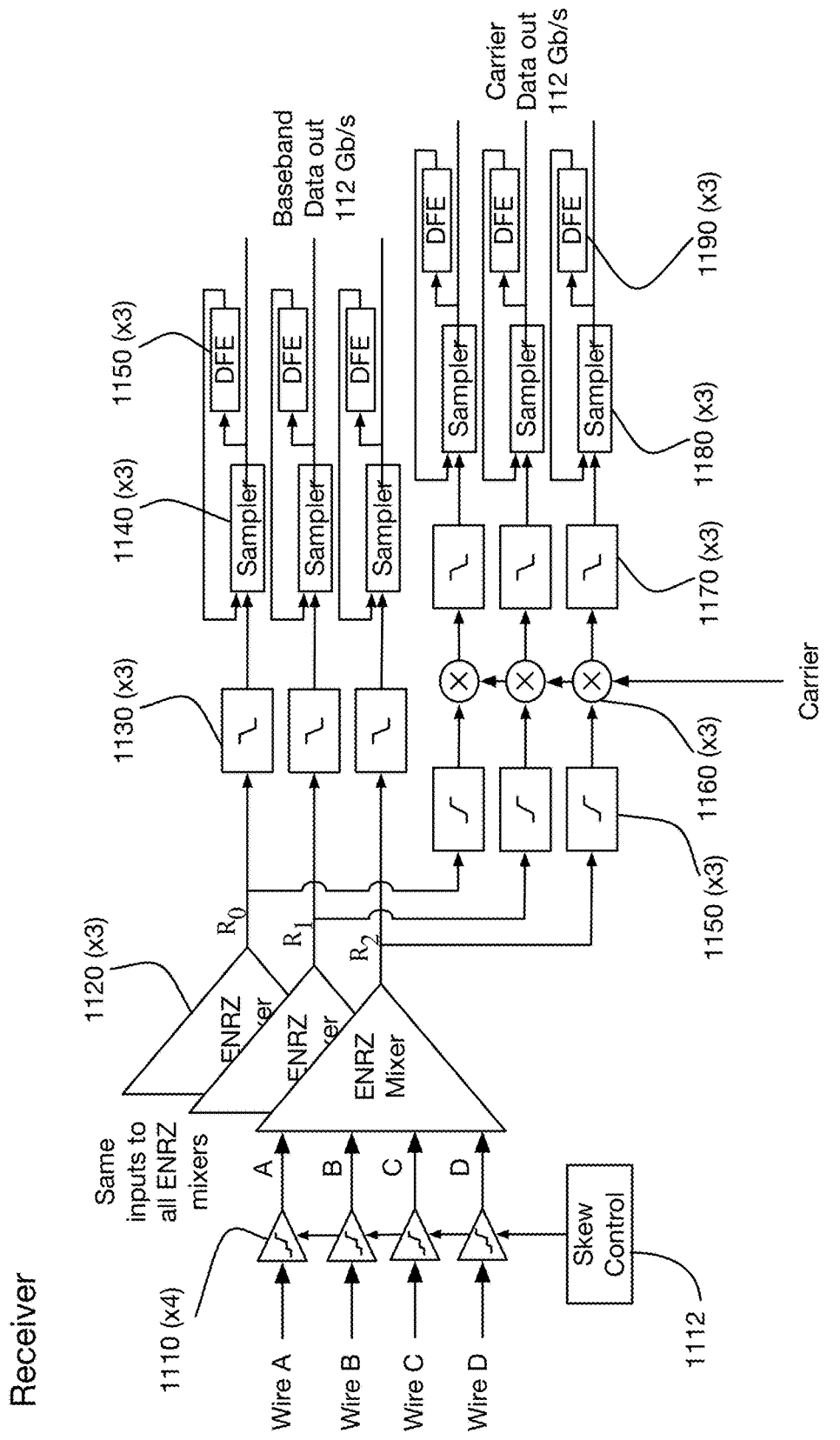
FIG. 11 is a block diagram of a receiver embodiment detecting baseband and carrier band signals.

One embodiment of a comparable Broadband Duobinary ENRZ receiver is shown in the block diagram of FIG. 11. Each wire signal from the transport medium Wire A, Wire B, Wire C, and Wire D is amplified and frequency equalized by a continuous-time linear equalizer (CTLE) 1110, and then the four amplified and equalized received signals are input to three linear ENRZ mixers 1120. In some embodiments, CTLEs 1110 may include analog delay circuits, and the receiver may include a skew control circuit 1112 configured to provide a skew control signal to each of the CTLEs 1110. In some embodiments, the analog delay circuits may be all-pass filters (including a switched capacitor bank, for example) configured to adjust an analog delay of each individual wire A-D. In some embodiments, the skew control circuit 1112 may be configured to operate on the outputs of samplers 1180 that operate on the passband MIC outputs in order to determine a skew control signal for adjusting analog delay values of each wire, however this should not be considered limiting. In one embodiment, each sub-channel MIC may be evaluated by adjusting decision thresholds, and responsively measuring an effective eye opening, and then individual wire skews may be adjusted in order to increase the effective eye opening. In some embodiments, the sub-channel MIC with the narrowest effective eye opening is adjusted first. Further, alternative analog delay circuits known to those of skill in the art may be implemented.

As taught by [Holden I], such ENRZ receive mixing is commonly utilized at baseband by so-called multi-input comparators (MIC) to detect ENRZ codewords. Here, the ENRZ mixing in such MICs produces three linear signal "subchannels" comprising a linear superposition of baseband and broadband, or carrier-modulated, results for each of the two ENRZ encoded streams. The mixing operations are defined as:

$$R_0 = (A+C)-(B+D) \quad \text{(Eqn. 2)}$$

$$R_1 = (C+D)-(A+B) \quad \text{(Eqn. 3)}$$

$$R_2 = (A+D)-(B+C) \quad \text{(Eqn. 4)}$$

where $R_0$, $R_1$, $R_2$ are the three resulting linear signal channels output from ENRZ mixers 1120, and A, B, C, D are the four received wire signals output from the CTLE 1110. Equivalent mixing results may be obtained using other algebraic permutations of these equations as may be produced by a different ordering of wire labels; as one example $R_1 = (A+B)-(C+D)$ is equivalent to Eqn. 3 if the wires are labeled in reverse order. MICs embodying such mixing results may also be identified by the signs of wire terms in their defining equation, e.g. ++−− for this example.

A four pole Butterworth lowpass filter 1130 with a cutoff frequency of 18.75 GHz is used to extract the baseband component from each of the linear signal subchannels. As is common practice in the art, the signal amplitude of each of the linear signal subchannels is measured or captured at a particular moment or interval of time by samplers 1140 at 37.5 Giga sample/second rate to produce the three decoded Baseband Data out bits, at an aggregate 112 Gigabit/second data rate. Concurrently, each decoded bit is presented to a DFE computation 1150, producing a DFE correction signal used to adjust that bit's sampler threshold. Digital Feedback Equalization is well known in the art, thus will not be further described here, other than noting that each DFE computation 1150 is independent, and will provide both correction of transport-channel-induced ISI and of intentionally generated transmitter ISI compensation.

It should be noted that the described DFE correction operating on subchannels of the vector signaling code is distinct from the common art, where which DFE correction is performed on e.g. received wire signals. As the history maintained by the DFE must accurately represent the values of each unit interval in the history, a conventional DFE would have to maintain ternary, quaternary, or higher-order history values to represent a vector signaling code having 3, 4, or more possible symbol values. In contrast, binary data communicated over a vector signaling code subchannel requires maintenance of merely a binary history using the described DFE correction.

Simultaneously, a second order Butterworth high pass filter 1150 with a cutoff of 37.5 GHz extracts the carrier channel information from the three linear signal subchannels. Balanced mixers 1160 provided with a 37.5 GHz carrier signal converts these modulated signals back to baseband where, as with the baseband channel signals, a four pole Butterworth lowpass filter 1070 with a cutoff frequency of 18.75 GHz is used followed by sampling 1080 at 37.5 Gig sample/second rate on each of the subchannels to produce the three decoded Carrier Data out bits, at an aggregate 112 Gigabit/second data rate. As with the baseband data, each decoded carrier data out bit is presented to a DFE computation 1190, producing a DFE correction signal used to adjust that bit's sampler threshold. Each DFE computation 1190 is independent, and will provide both correction of transport-channel-induced ISI and of intentionally generated transmitter ISI compensation.

Because of the significant frequency-dependent loss characteristics of the transport channel, the gain of the receive baseband channel is set to 14 dB, while the gain of the carrier channel is set to 26 dB. Similarly, the transmitter gain for the carrier channel is set to 3 times that of the baseband channel to provide pre-emphasis.

Figure 7:
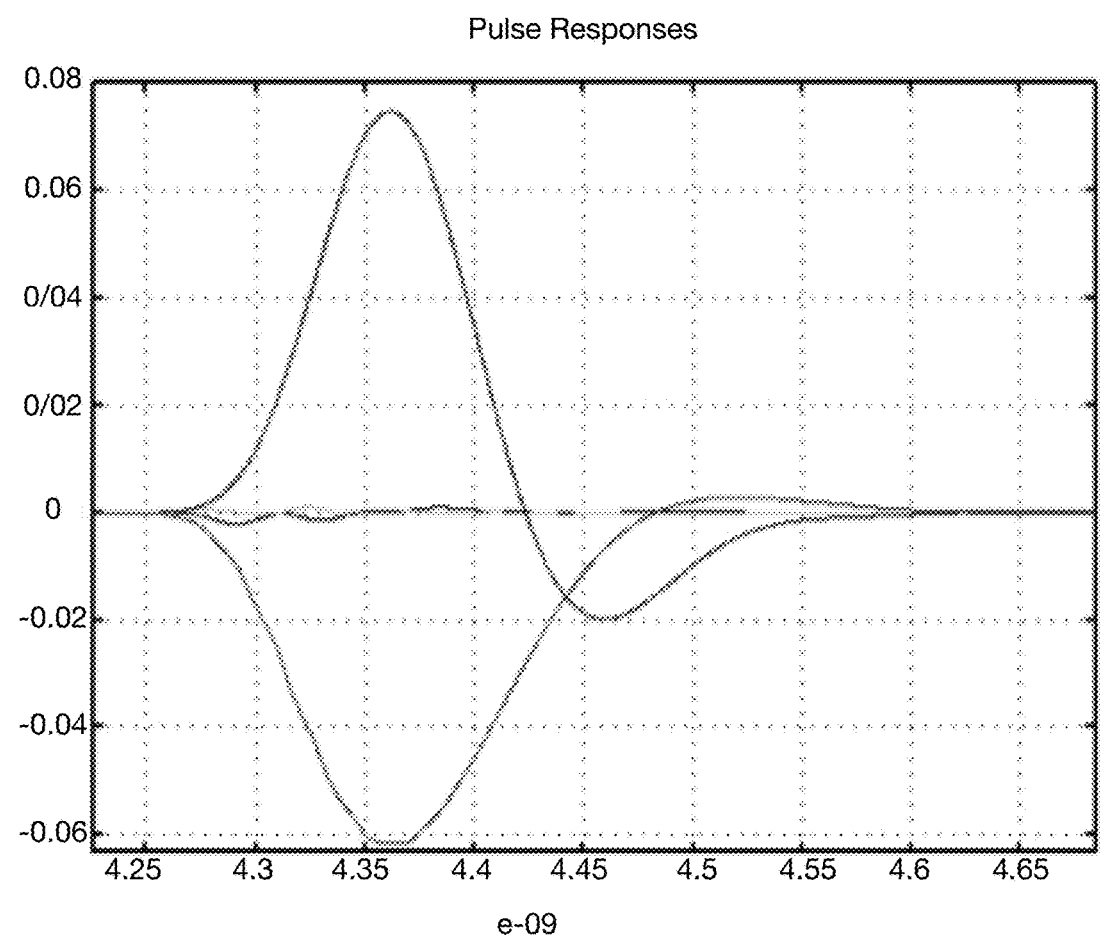
FIG. 7 show simulated pulse responses and cross-channel ICI for the third embodiment.
Figure 8:
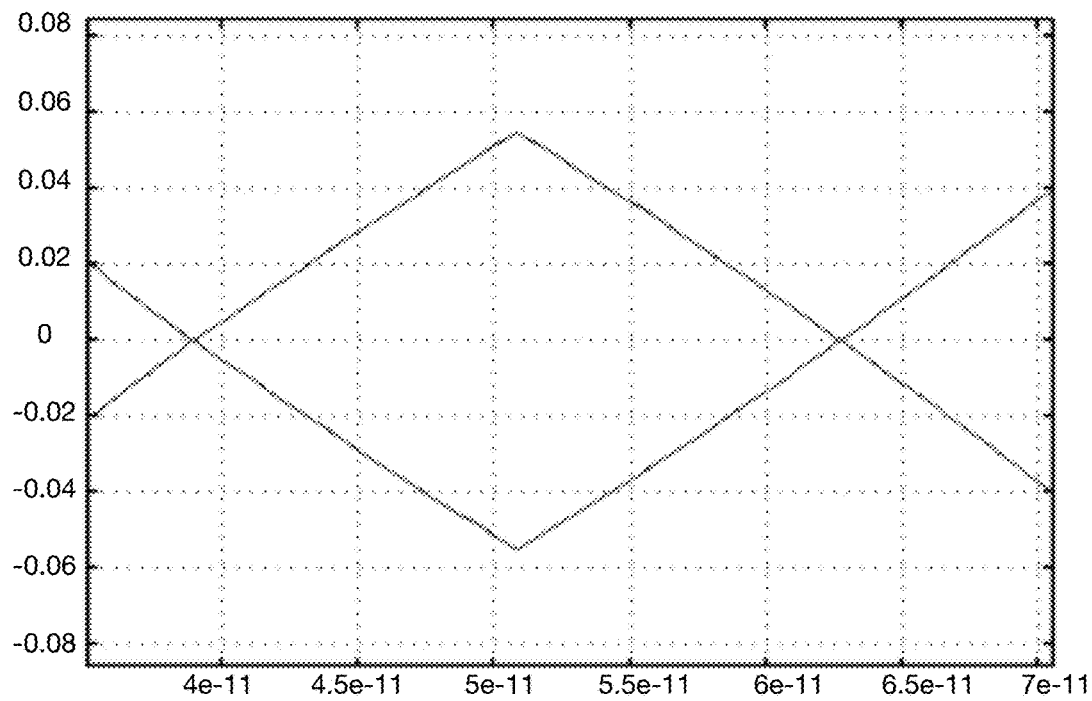
FIG. 8 shows the simulated receive eyes for the third embodiment.
Figure 8:
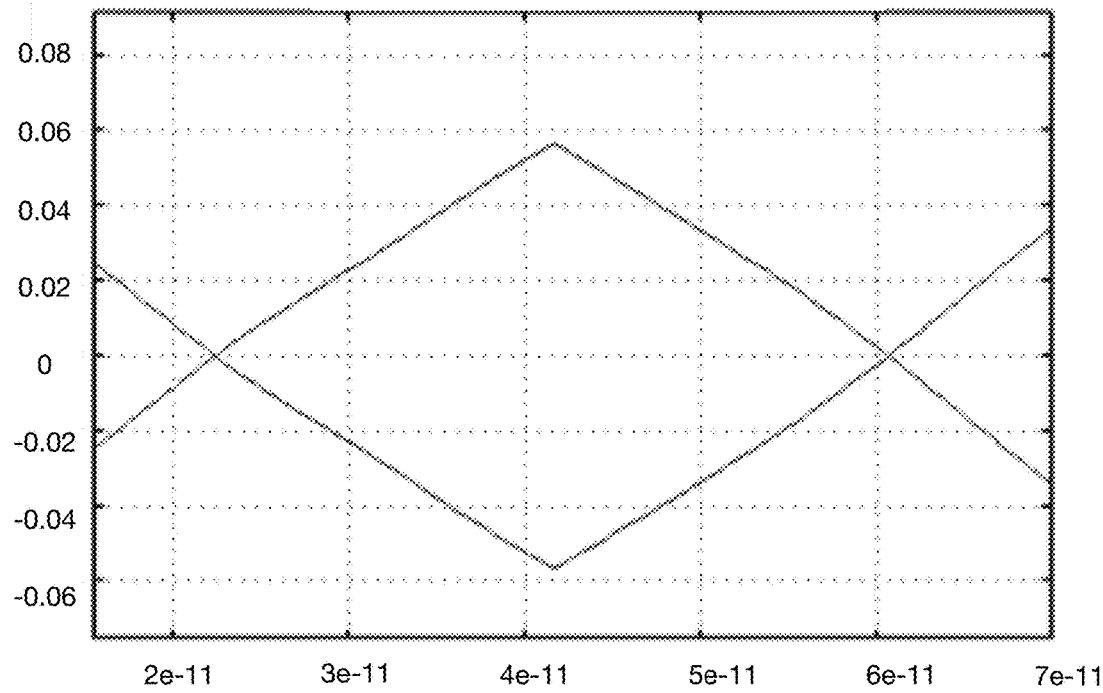

Simulated pulse responses and cross-channel ICI for this embodiment are shown in FIG. 7, assuming two taps of transmit FFE and fifteen taps of receive DFE. Receive eyes for the baseband and carrier (passband) channels are shown in FIG. 8. Eye openings are 54 mV vertical and 24.1 psec horizontal for the baseband, and 56 mV vertical and 38.7 psec horizontal for the passband, a considerable improvement over the previous embodiments.

Skew Considerations

As with any vector signaling code solution, skew must be constrained across the transport paths carrying symbols of the same codeword, as the codeword must be presented as a coherent whole to the receiver's detector to be properly recognized. Roughly speaking, propagation latencies across the various transport paths must be matched to less than one half the expected eye width to permit detection, and better than that value to avoid eye width degradation. Known approaches including introduction of variable delay lines and/or FIFO buffers for path compensation, separate CDR and sample timing for individual wires, and transmit-side pre-skew compensation. However, these techniques must be applied cautiously, as they may also lead to increased inter-symbol interference, transmit simultaneous switching noise, and higher perceived receive common mode signals.

Because the baseband and carrier-band channels carry separate ENRZ encoded data and are separately receive sampled, their data streams may be considered to be independent and thus do not require absolute temporal alignment. This is an advantage, as differences between the filtering characteristics of the two channels will introduce different time delays, which inherently introduces a timing difference between the set of data bits received at baseband, and the set of data bits received at carrier band. As will be apparent to one familiar with the art, these sets of bits may be passed through retiming latches, FIFO buffers, or other known means to align them with a common timing reference.

Alternative Embodiments

A number of variations to the preceding embodiments have been considered, all within the scope of the described invention. Transmit signal generation of the ENRZ symbol values, their ISI-controlling encodings, or both may be produced using Digital to Analog converters having an appropriate number of bits. Similarly, mixing of broadband and carrier signals within the transmitter may be done digitally.

Transmitter and receiver embodiments may incorporate additional gain and/or frequency-dependent filtering stages to meet the described vertical eye openings, or to compensate for channel characteristics differing from those of the reference channel model. Particular amplitudes, gains, attenuation characteristics, etc. are provided for descriptive purposes, without implying limitation.

At least one embodiment performs additional prefiltering of signals within the transmitter to zero out the first few pre-cursors of the channel, thus avoiding the need for extensive DFE tap unrolling at the receiver.

The example broadband receiver embodiment described converts the carrier-based channel to baseband for subsequent detection. This presumes that the local carrier available at the receiver is coherent with the transmitter's carrier signal, and is thus derived using a Phase-locked loop or other known method. Other known art receiver methods are well known and may also be incorporated in alternative and equivalent embodiments.

A receiver embodiment may also utilize Analog-to-Digital sampling followed by some or all of the previously-described filtering, mixing, and sampling being performed using digital signal processing methods.

Extension to Higher Data Rates

The embodiments described herein may be extended to support data rates of 224 Gigabits per second per wire pair.

In a fourth embodiment incorporating such extension, the data is prefiltered at the transmitter to add more controlled ISI. As one example, a Hamming filter of order 7 is used having the coefficients:

$$H=[0.02, 0.09, 0.23, 0.30, 0.23, 0.09, 0.02] \qquad \text{[Eqn. 5]}$$

This is contrasted with the duobinary encoding of the previous examples, which corresponds to a transmit filter with the coefficients:

$$H=[0.5, 0.5] \qquad \text{[Eqn. 6]}$$

Figure 12:
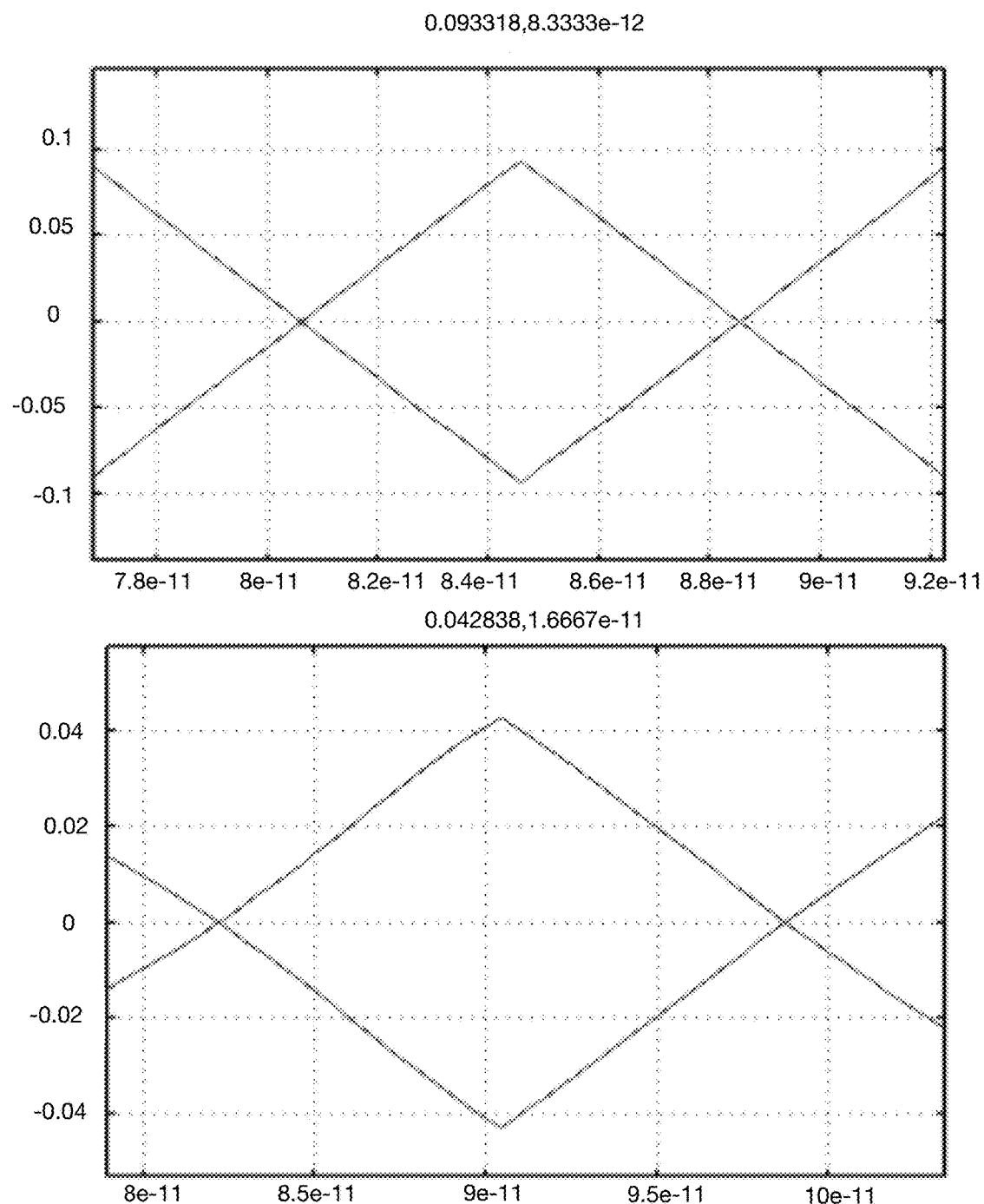
FIG. 12 shows simulated eye openings for a fourth embodiment, utilizing a baseband plus a single carrier band operating at 224 Gigabits/second per wire pair.

In this fourth embodiment the data rate in each of the baseband and carrier channels is doubled, to 75 Gigasymbols/second, resulting in an aggregate data throughput equivalent to 112 Gigabits per second per wire, or 448 Gigabits per second for the four wire interconnection. Simulated eye openings are shown in FIG. 12, where the baseband channel has 93 mV of vertical and 8.3 psec of horizontal eye opening, and the carrier channel has 42 mV of vertical and 16.6 psec of horizontal eye opening, assuming 3 pre-cursor taps of transmit equalization, and 15 taps of receive DFE.

Alternatively, an embodiment may utilize additional carrier channels. As one example, a baseband channel plus three carrier channels operating at carrier frequencies chosen to minimize the frequency overlap between spectral components of the various channels may be combined, with each channel carrying a data stream combining ENRZ encoding with an ISI-controlling encoding with each channel operating at a rate of 37.5 Gigasymbols/second as previously described.

Extension to Other Base Signaling Schemes

As previously noted, the embodiments described herein may be used with underlying vector signaling codes other than ENRZ, which has been used for purposes of description in the previous examples without implying a limitation. Other multi-wire signaling schemes may also be combined with the described ISI management and channelization techniques, as should be understood by anyone of ordinary skill in the art.

For example, a fifth embodiment is identical to that of the previously described fourth embodiment, except that differential signaling is used on each two wire pair at a signaling rate of 75 Gigabits/second/pair, rather than ENRZ across all four wires. Data on each channel is prefiltered at the transmitter to add more controlled IS using a Hamming filter of order 7 having the coefficients:

$$H=[0.02, 0.09, 0.23, 0.30, 0.23, 0.09, 0.02] \quad [\text{Eqn. 7}]$$

In this fifth embodiment the aggregate throughput is thus 300 Gigabits/second; 75 Gigabits/second per wire pair for two wire pairs, for each of the two channels.

Use of a Lower Carrier Frequency

As previously mentioned, a lower carrier frequency may be used to bring the carrier-modulated channel into a lower attenuation region of the transport channel model, at the cost of increased inter-channel interference.

A sixth embodiment operates with a baseband channel and one carrier channel modulating a carrier frequency of 19.5 GHz. Both baseband and carrier channels utilize ENRZ encoding and Duobinary filtering, as previously described, at a signaling rate of 37.5 GBaud, equivalent to a 26.66 psec UI. The resulting signal spectrum experiences a 15 dB channel loss at baseband, and a 30 dB loss at the carrier channel. The simulation results shown in FIG. 13 and summarized in Table 2 are based on 600 mV Tx amplitude, 200 uV RMS channel noise, a 1:7 baseband to carrier channel power ratio, 1 pre- and 1 post-cursor TX FIR, up to 12 dB of Rx CTLE, and 12 taps of Rx DFE. Eye openings sufficient to obtain at least a 10E-6 Bit Error Rate (BER) were observed.

TABLE 2

| Band | MIC | Vertical mV | Horizontal psec | % UI |
|---|---|---|---|---|
| Carrier | ++-- | 3.97 | 16.66 | 62.5 |
| Channel | +-+- | 5.87 | 20.21 | 75.8 |
|  | +--+ | 5.87 | 20.21 | 75.8 |
| Baseband | ++-- | 6.64 | 17.29 | 64.9 |
|  | +-+- | 6.43 | 17.08 | 64.1 |
|  | +--+ | 6.45 | 17.08 | 64.1 |

For descriptive convenience, the three ENRZ subchannels on each of the Carrier and Baseband frequencies are identified by the logical wire combinations comprising the defining equation of their corresponding multi-input mixer. Thus, as one example, the mixed combination of wires A, B, C, D corresponding to the mixer performing the (A+B)−(C+D) operation is identified as ++-- in Table 2.

Figure 13:
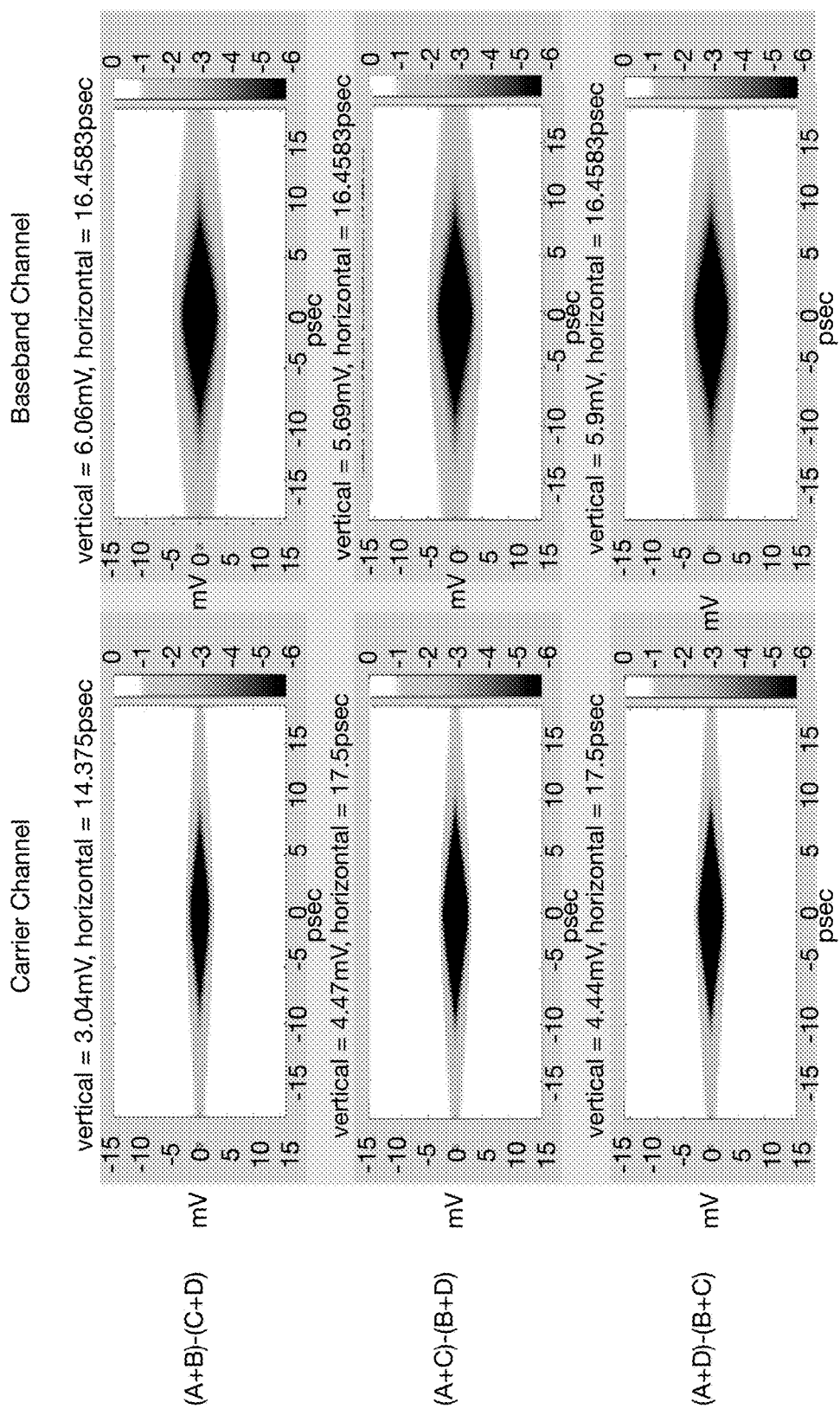
FIG. 13 shows simulated eye openings for a sixth embodiment, utilizing a baseband plus a single carrier band operating at 112 Gigabits/second per wire pair.

As may be seen in FIG. 13 and Table 2, the eye opening for the ++-- carrier subchannel is significantly smaller than the other eyes, and is thus the limiting factor on performance. In particular, the reduced horizontal eye opening indicates that subchannel may be significantly impacted by wire skew in the transport channel.

Incorporation of Error Correcting Codes

Figure 14:
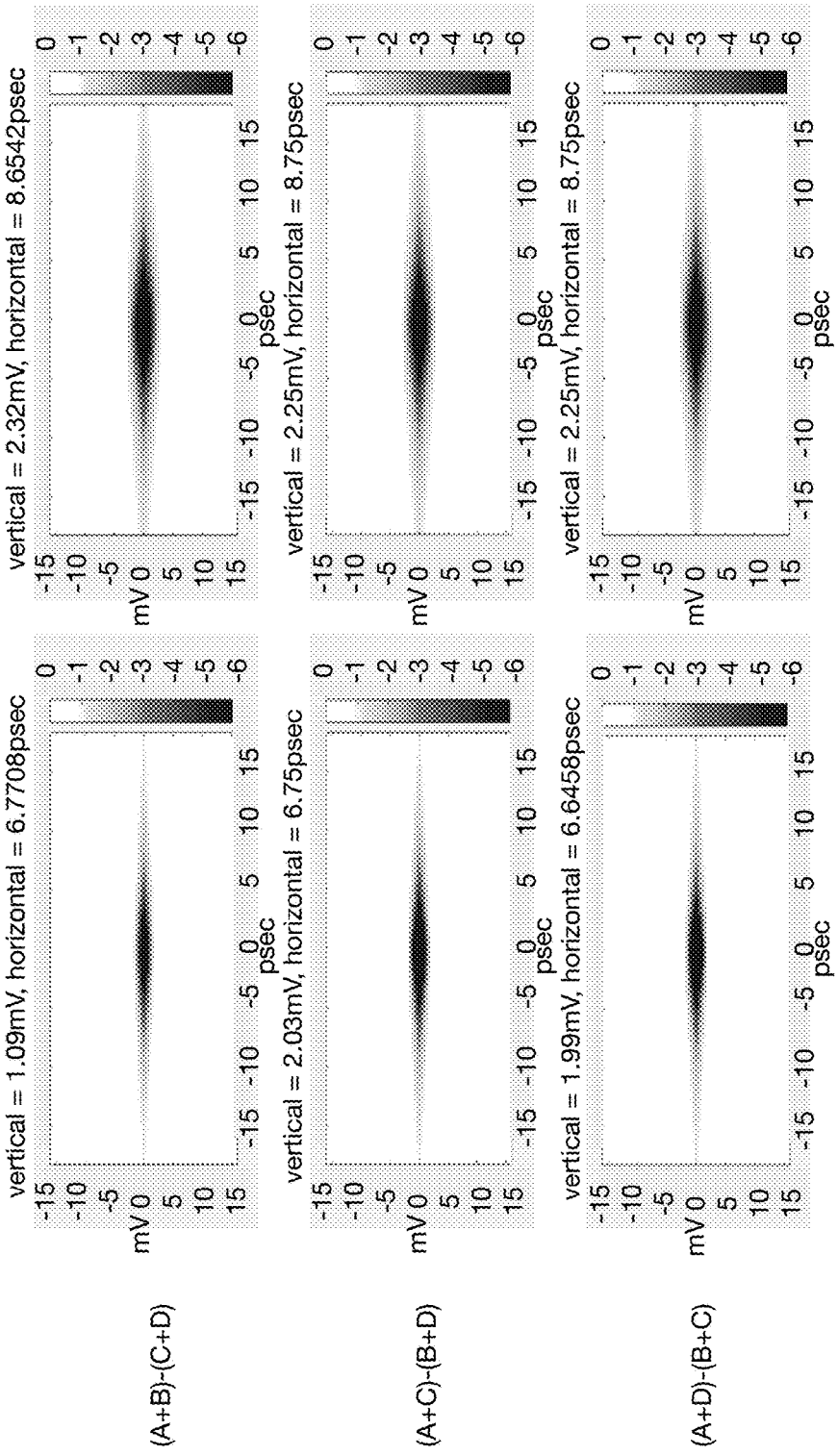
FIG. 14 shows simulated eye openings for a seventh embodiment, utilizing a baseband plus a single carrier band operating at 224 Gigabits/second per wire pair.

A seventh embodiment operates with a baseband channel and one carrier channel modulating a carrier frequency of 18.5 GHz. Both baseband and carrier channels utilize ENRZ encoding and order 11 Hamming filtering, at a signaling rate of 75 GBaud, equivalent to a 13.33 psec UT. The resulting signal spectrum experiences a 14 dB channel loss at baseband, and a 22 dB loss at the carrier channel. The simulation results shown in FIG. 14 and summarized in Table 3 are based on 800 mV Tx amplitude, 200 uV RMS channel noise, 260 femto-seconds of random jitter (Rj), a 1:7 baseband to carrier channel power ratio, 1 pre- and 1 post-cursor TX FIR, up to 12 dB of Rx CTLE, and 25 taps of Rx DFE.

TABLE 3

| Band | MIC | Vertical mV | Horizontal psec | % UI |
|---|---|---|---|---|
| Carrier | ++-- | 1.76 | 8.65 | 64.9 |
| Channel | +-+- | 3.02 | 10.52 | 78.9 |
|  | +--+ | 2.93 | 10.31 | 77.3 |
| Baseband | ++-- | 2.86 | 9.48 | 71.1 |
|  | +-+- | 2.74 | 9.38 | 70.4 |
|  | +--+ | 2.72 | 9.38 | 70.4 |

As with the previous example, eye openings sufficient to obtain a 1E-6 BER were observed, with the ++-- carrier subchannel again limiting the overall performance, especially in the presence of transport channel wire skew.

Various approaches were considered to mitigate this subchannel limiting performance, allowing improved system BER to be achieved.

An eighth embodiment is identical to the previously described seventh embodiment, but the marginal ++-- carrier subchannel is not used to transmit data. This results in an overall throughput of 5*75=375 Gbps over the four wire transport medium, equivalent to an effective 187.25 Gbps per wire pair.

A ninth embodiment is identical to the previously described seventh embodiment, with an additional reliability protocol imposed on data transmitted over the marginal ++-- carrier subchannel. As one example offered without limitation, a "send three times" reliability protocol may be used on that subchannel to transmit the same data bit in three consecutive UIs, with a majority detector used at the receiver to identify the received data bit. Thus, this embodiment transmits a total of 16 bits (rather than the seventh embodiment's 18) in three Ms. This results in an overall throughput of 6*75*(16/18)=400 Gbps over the four wire transport medium, equivalent to an effective 200 Gbps per wire pair. Addition of this reliability protocol provides an effective BER of 1E-6 if the underlying subchannel provides at least a 5.7E-4 BER, equivalent to an improvement of the vertical eye by 6 dB and almost a doubling of the horizontal eye opening.

A tenth embodiment is identical to the previously described seventh embodiment, with a Forward Error Correcting protocol imposed on data transmitted over the marginal ++-- carrier subchannel. As one example offered without limitation, four consecutive data bits may be encoded using a [7,4,3] Hamming code to produce seven Hamming encoded bits to be sequentially transmitted over that subchannel in seven UIs, with the corresponding Hamming decoder used at the receiver to recover the received data bits. Thus, this embodiment transmits a total of 39 (rather than the seventh embodiment's 42) data bits in seven consecutive UIs, resulting in an overall throughput of 6*75*(39/42)=417.86 Gbps. equivalent to an effective 208.93 Gbps per wire pair. Addition of this FEC encoding provides an effective BER of 1E-6 if the underlying subchannel provides at least a 3.6E-3 BER, equivalent to an improvement of the vertical eye opening by 7 dB and an 2.5× enlargement of the horizontal eye opening.

Figure 15:
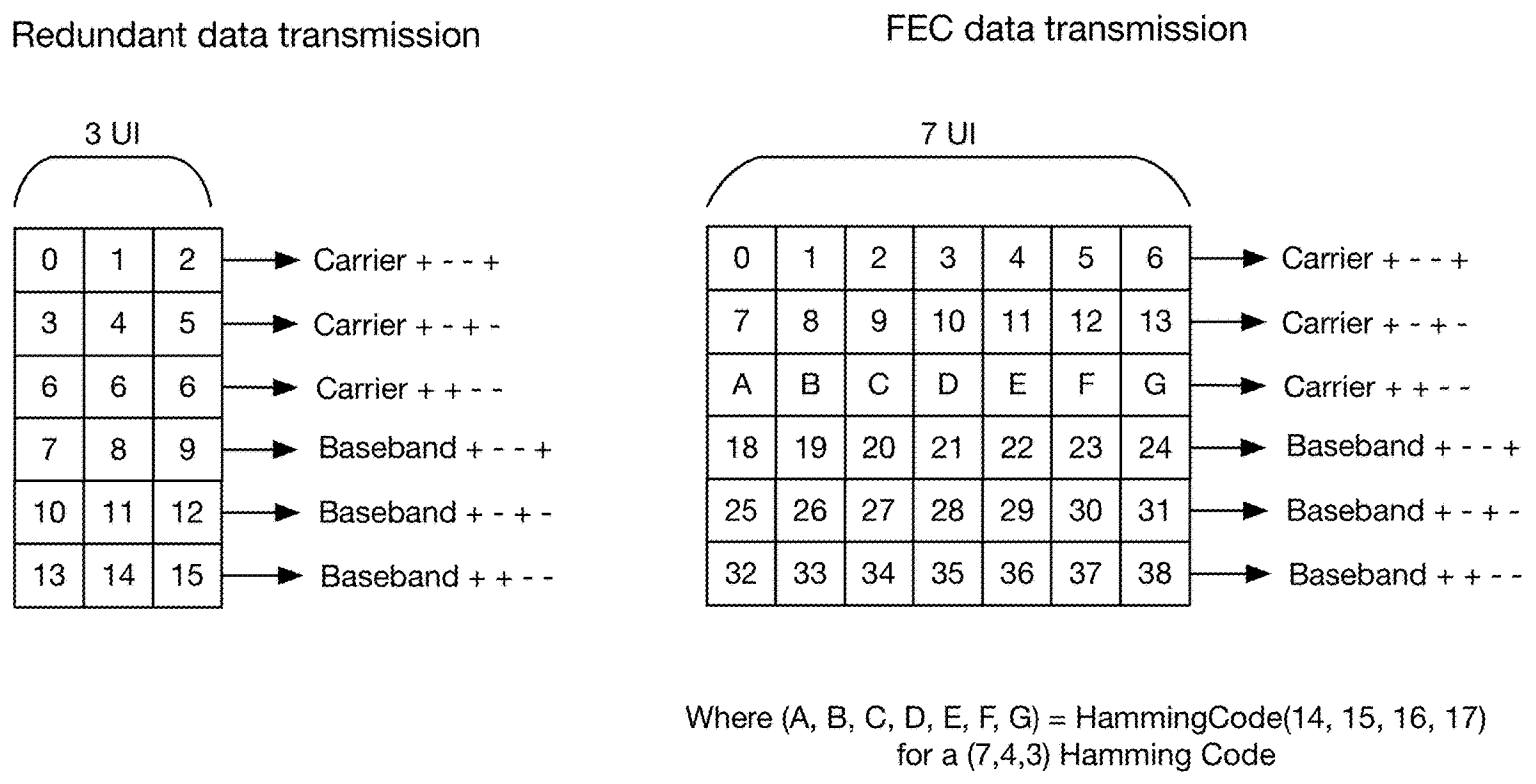

This distribution of data bits and redundancy-augmented bits across the six subchannels and multiple sequential transmit unit intervals as described relevant to the ninth and tenth embodiments of the invention is illustrated in FIG. 15.

Figure 16:
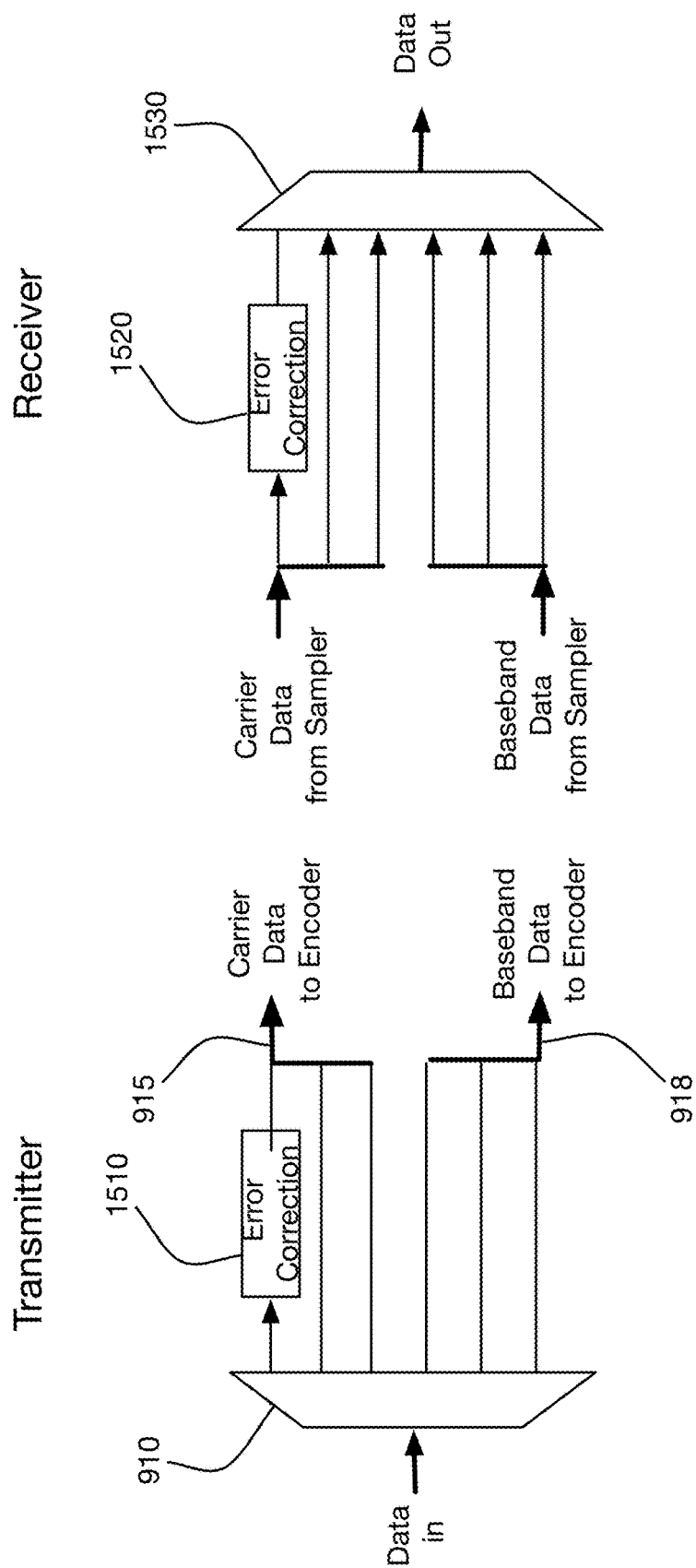
FIG. 16 is a block diagram illustrating the insertion error correction processing into the ++−− carrier subchannel as described for the ninth and tenth embodiments of invention.

FIG. 16 is a block diagram showing error correction being added to an encoded transmission subchannel and the corrected data identified at the receiver. At the transmitter, Data In is distributed 910 among the carrier subchannels and the baseband subchannels, as previously shown relative to FIG.

9 and FIG. 10. The portion of the data bits directed to the ++−− carrier subchannel are passed through an error correction function 1510 which increases its redundancy; relative to the ninth embodiment this redundancy is obtained via repetition, relative to the tenth embodiment this redundancy is obtained via a Hamming Code encoder. The data bits directed to the carrier subchannels 915 and the data bits directed to the baseband subchannels 918 are then processed as previously described in FIG. 9 or FIG. 10. At the receiver, data from the sampler associated with the ++−− mixer carrier channel is directed to error correction function 1520, which identifies the original data bits; a majority detector is used relative to the ninth embodiment, and a Hamming Code decoder is used relative to the tenth embodiment. The original data bits from 1520 and the sampler outputs from the other subchannels may be combined 1530 to produce an aggregated received data stream identical to that presented to the transmitter.

It will be obvious to one skilled in the art that redundancy and/or forward error correction may be applied to more than one subchannel, with a corresponding improvement in that subchannel's effective eye opening but also resulting in decreased delivered data rate due to the inevitable overhead. Thus, these examples applying such solution to a single subchannel should not be considered as limiting, but may be preferred within the parameters of the example.

The invention claimed is:

1. A method comprising:
receiving, at a plurality of orthogonal subchannel multi-input comparators (MICs), a set of wire-specific inputs, each wire-specific input carrying a combination of a respective baseband symbol of a baseband codeword and at least one respective carrier-modulated symbol of at least one carrier-modulated codeword; and
generating a plurality of superposition subchannel signals, each superposition subchannel signal generated by a corresponding orthogonal subchannel MIC forming a respective subchannel-specific linear combination of the set of wire-specific inputs, each superposition subchannel signal comprising a respective superposition of (i) a baseband subchannel signal and (ii) one or more carrier-modulated subchannel signals, the baseband subchannel signal and the one or more carrier-modulated subchannel signals associated with the baseband codeword and the at least one respective carrier-modulated codeword, respectively.

2. The method of claim 1, further comprising generating a set of decoded output bits based on the plurality of superposition subchannel signals.

3. The method of claim 2, wherein generating the set of decoded output bits are generated using a plurality of samplers.

4. The method of claim 3, further comprising applying decision feedback equalization (DFE) correction signals to adjust thresholds of the plurality of samplers.

5. The method of claim 1, further comprising parsing, using a plurality of filters, each superposition subchannel signal of the plurality of superposition subchannel signals into the baseband subchannel signal and the at least one carrier-modulated subchannel signal.

6. The method of claim 1, further comprising generating, for each of the at least one carrier-modulated subchannel signal, a corresponding demodulated-baseband subchannel signal using a balanced mixer circuit of a set of at least one balanced mixer circuit.

7. The method of claim 1, wherein each respective subchannel-specific linear combination is performed according to a row of an orthogonal matrix.

8. The method of claim 7, wherein the orthogonal matrix is a Hadamard matrix.

9. The method of claim 8, wherein the Hadamard matrix has a size of 4.

10. The method of claim 1, wherein the baseband codeword and the at least one carrier-modulated codeword are balanced.

11. An apparatus comprising:
a plurality of wires of a multi-wire bus, the plurality of wires configured to carry a set of wire-specific inputs, each wire-specific input comprising a combination of a respective baseband symbol of a baseband codeword and at least one respective carrier-modulated symbol of at least one carrier-modulated codeword; and
a plurality of orthogonal subchannel multi-input comparators (MICs) configured to generate a plurality of superposition subchannel signals, each superposition subchannel signal generated by a corresponding orthogonal subchannel MIC forming a respective subchannel-specific linear combination of the set of wire-specific inputs, each superposition subchannel signal comprising a respective superposition of (i) a baseband subchannel signal and (ii) one or more carrier-modulated subchannel signals, the baseband subchannel signal and the one or more carrier-modulated subchannel signals associated with the baseband codeword and the at least one respective carrier-modulated codeword, respectively.

12. The apparatus of claim 11, further comprising a plurality of samplers configured to generate a set of decoded output bits based on the plurality of superposition subchannel signals.

13. The apparatus of claim 12, further comprising a decision feedback equalization (DFE) circuit configured to generate a set of DFE correction signals based on the set of decoded output bits.

14. The apparatus of claim 13, wherein the DFE correction signals adjust sampling thresholds of the plurality of samplers.

15. The apparatus of claim 11, further comprising a plurality of filters configured to parse each superposition subchannel signal of the plurality of superposition subchannel signals into the baseband subchannel signal and the at least one carrier-modulated subchannel signal.

16. The apparatus of claim 11, further comprising a set of at least one balanced mixer circuits, each balanced mixer circuit configured to operate on a respective carrier-modulated subchannel signal and to responsively generate a corresponding demodulated-baseband subchannel signal.

17. The apparatus of claim 11, wherein each respective subchannel-specific linear combination is performed according to a row of an orthogonal matrix.

18. The apparatus of claim 17, wherein the orthogonal matrix is a Hadamard matrix.

19. The apparatus of claim 18, wherein the Hadamard matrix has a size of 4.

20. The apparatus of claim 11, wherein the baseband codeword and the at least one carrier-modulated codeword are balanced.

* * * * *